United States Patent
Hikihara et al.

(10) Patent No.: US 9,787,090 B2
(45) Date of Patent: Oct. 10, 2017

(54) POWER PACKET GENERATION DEVICE, POWER ROUTER, AND POWER NETWORK

(71) Applicant: Kyoto University, Kyoto-shi, Kyoto (JP)

(72) Inventors: Takashi Hikihara, Kyoto (JP); Shun-ichi Azuma, Kyoto (JP); Ryo Takahashi, Kyoto (JP); Keiji Tashiro, Kyoto (JP)

(73) Assignee: Kyoto University, Kyoto (JP)

( * ) Notice: Subject to any disclaimer, the term of this patent is extended or adjusted under 35 U.S.C. 154(b) by 176 days.

(21) Appl. No.: 14/892,159

(22) PCT Filed: May 20, 2014

(86) PCT No.: PCT/JP2014/063363
§ 371 (c)(1),
(2) Date: Nov. 18, 2015

(87) PCT Pub. No.: WO2014/189051
PCT Pub. Date: Nov. 27, 2014

(65) Prior Publication Data
US 2016/0094029 A1     Mar. 31, 2016

(30) Foreign Application Priority Data
May 21, 2013  (JP) ................................ 2013-107393

(51) Int. Cl.
*H02J 1/10*    (2006.01)
*H02J 3/38*    (2006.01)
*H02J 13/00*   (2006.01)

(52) U.S. Cl.
CPC ................ *H02J 1/10* (2013.01); *H02J 1/108* (2013.01); *H02J 13/0031* (2013.01)

(58) Field of Classification Search
USPC ...................................................... 307/43, 52
See application file for complete search history.

(56) References Cited

U.S. PATENT DOCUMENTS

| | | | |
|---|---|---|---|
| 2011/0233998 A1 | 9/2011 | Tajima | |
| 2013/0082525 A1* | 4/2013 | Szu | H02J 1/108 307/26 |

(Continued)

FOREIGN PATENT DOCUMENTS

| | | |
|---|---|---|
| EP | 2 360 848 | 8/2011 |
| JP | 2010-148172 | 7/2010 |
| JP | 2011-142771 | 7/2011 |

OTHER PUBLICATIONS

Takuno, et al., "In-home Power Distribution Systems by Circuit Switching and Power Packet Dispatching" Smart Grid Communications (SmartGridComm), 2010 First IEEE International Conference on, IEE, Piscatway, NJ, USA, Oct. 4, 2010, pp. 427-430.

(Continued)

*Primary Examiner* — Adam Houston
(74) *Attorney, Agent, or Firm* — Hamre, Schumann, Mueller & Larson, P.C.

(57) ABSTRACT

A mixer (power packet generation device) 2 includes switches 21A, 21B, packet generation means 28A, 28B, and a selector 29. The packet generator 28A (28B) causes the switch 21A (21B) to perform ON/OFF operation, based on a target voltage, and a voltage estimated as being applied to a load 4A (4B) in each of a state where a power packet is supplied to the load and a state where no power packet is supplied to the load. The selector 29 performs switching between a state where the packet generators 28A, 28B cause the switches 21A, 21B to perform ON/OFF operation, and a state where the packet generators 28A, 28B maintain the switches 21A, 21B in their OFF states.

10 Claims, 16 Drawing Sheets

(56) References Cited

U.S. PATENT DOCUMENTS

| | | | | |
|---|---|---|---|---|
| 2015/0256214 A1* | 9/2015 | Lee | ........................ | H04B 17/14 455/83 |
| 2015/0355667 A1* | 12/2015 | Kogo | ........................ | H02J 3/14 307/52 |
| 2016/0094029 A1* | 3/2016 | Hikihara | .................... | H02J 1/10 307/29 |
| 2016/0134109 A1* | 5/2016 | Kogo | ........................ | H02J 3/46 307/24 |
| 2016/0227483 A1* | 8/2016 | Wang | ................ | H04W 52/0245 |
| 2016/0352349 A1* | 12/2016 | Yoshioka | .............. | H03M 1/124 |
| 2017/0048838 A1* | 2/2017 | Chrisikos | .......... | H04W 72/0406 |

OTHER PUBLICATIONS

Takahashi, et al., "Design and Experimental Verification of Power Packet Generation System for Power Packet Dispatching System", 2013 American Control Conference (ACC), Washingtong, DC, USA, Jun. 17-19, 2013, pp. 4368-4373.

Tashiro, et al., "Feasibility of Power Packet Dispatching at In-home DC Distribution Network", Smart Grid Communications (SmartGridComm), 2012 IEEE Third International Conference on, IEEE, Nov. 5, 2012, pp. 401-405.

Tashiro, et al., "A Basic Experiment on Power Packet Dispatching System with Buffer", The Papers of IEEJ Technical Meeting SPC-12-2, Jan. 27, 2012, pp. 7-12, Abstract.

Takahashi, et al., "Power Packetization for 2-power-source × 2-load Connection", IEICE Technical Report, EE2012-10, Jul. 2012, pp. 51-56.

Azuma, et al., "Optimal dynamic quantizers for discrete-valued input control", Automatica, vol. 44, No. 2, Feb. 2008, pp. 396-406.

Extended European Search Report issued in corresponding European patent application No. 14801363.4, dated Mar. 7, 2017, 10 pages.

Hikihara, "Power Packetization and Routing Technology", IPSJ Magazine, vol. 51, No. 8, Aug. 2010, pp. 943-950, see ISR for concise explanation.

Takuno, et al., "Power Packet Routing with Multiple Input Multiple Output Power Conversion Circuits", IEICE General Conference, Mar. 2010, pp. S-140-S-141, see ISR for concise explanation.

Takuno, et al., In-home Power Distribution Systems by Circuit Switching and Power Packet Dispatching, 2010 First IEEE International Conference on Smart Grid Communications, Oct. 2010, pp. 427-430.

Takahashi, et al., "Design and Experimental Verification of Power Packet Generation System for Power Packet Dispatching System", 2013 American Control Conference, Jun. 2013, pp. 4368-4373.

International Search Report issued in International Application No. PCT/JP2014/063363, dated Jun. 17, 2014, 2 pages.

* cited by examiner

HEADER (CONTROL INFORMATION)

| START SIGNAL | TRANSMISSION SOURCE INFORMATION (POWER SOURCE TYPE INFORMATION) | TRANSMISSION DESTINATION ADDRESS |
|---|---|---|

POWER PACKET GENERATION DEVICE, POWER ROUTER, AND POWER NETWORK

TECHNICAL FIELD

The present invention relates to a power packet generation device, a power router, and a power network.

BACKGROUND ART

Conventionally, a system for packetizing electric power and transmitting/distributing the packetized power has been proposed (refer to PATENT LITERATURE 1, for example).

A power packet used in this type of system is generally configured to include a payload that carries electric power to be transmitted, and a header that indicates a destination of the power packet.

CITATION LIST

Patent Literature

PATENT LITERATURE 1: Japanese Laid-Open Patent Publication No. 2011-142771

SUMMARY OF INVENTION

Technical Problem

Incidentally, in recent years, when a plurality of loads exist, there is a demand for supply of power packets to the respective loads from different power sources depending on the loads. For example, there is a situation where a consumer who wishes to receive electric power supply from a power station that performs power generation from renewable energy, such as solar power generation, and a consumer who wishes to receive electric power supply from a thermal power station that offers relatively stable power supply, are mixed.

Meanwhile, the number of power transmission lines for supplying electric power to the respective consumers is limited, and therefore, power packets have to be supplied from a plurality of power sources to one transmission line.

In this case, when the power packets are simultaneously outputted from the plurality of power sources to the one transmission line, the power packets may interfere with each other, which may cause deformation of waveforms of headers indicating destinations of the power packets. In this case, the power packets may not be supplied to desired destinations.

The present invention has been made in view of the above-described circumstance, and an object of the present invention is to provide a power packet generation device which is configured to output a plurality of power packets to one transmission path, and yet is capable of preventing deformation of waveforms of the power packets due to collision of the power packets.

Solution to Problem

A power packet generation device according to the present invention is a power packet generation device configured to generate power packets to be supplied to a plurality of loads, from electric power supplied from at least one DC power source, and transmit the generated power packets to a main transmission line so that target voltages are applied to the respective loads. The power packet generation device includes: a plurality of switches respectively interposed in a plurality of sub transmission lines each connecting the DC power source to the main transmission line; a plurality of packet generators configured to generate the power packets by causing the switches to perform ON/OFF operation, based on the target voltages, and voltages estimated as being applied to the respective loads in each of a first state where the power packets are supplied to the loads and a second state where the power packets are not supplied to the loads; and a selector configured to perform switching between a state where the packet generators cause the switches to perform ON/OFF operation, and a state where the packet generators maintain the switches in their OFF states.

According to the above configuration, the selector performs switching between the state where the packet generators control ON/OFF of the switches, and the state where the packet generators do not control ON/OFF of the switches. Thereby, the power packet generation device can be in the state where the power packets are transmitted to the main transmission line, and the state where the power packets are not transmitted to the main transmission line. Therefore, when the packet generators cause any one of the plurality of switches to perform ON/OFF operation, the other switches can be maintained in their OFF states. Thus, even in the configuration in which a plurality of power packets are transmitted to one main transmission line, the power packets are prevented from colliding with each other, thereby preventing the waveforms of the power packets from being deformed.

Further, in the power packet generation device according to the present invention, the plurality of packet generators may be provided so as to correspond to the plurality of switches, respectively, and the selector may set any one of the plurality of packet generators in a generation state where the packet generator generates the power packet by causing the switches to perform ON/OFF operation, and set all the other packet generators in a non-generation state where the packet generators do not generate the power packets by maintaining the switches in their OFF states.

According to the above configuration, the selector sets any one of the plurality of packet generators in the generation state where the packet generator generates the power packet by causing the switches to perform ON/OFF operation, and sets all the other packet generators in a non-generation state where the packet generators do not generate the power packets by maintaining the switches in their OFF states. Therefore, the power packets transmitted from the respective packet generators do not interfere with each other, thereby preventing the waveforms of headers indicating the transmission destinations of the power packets from being deformed. As a result, it is possible to avoid the drawback that the power packets are not transmitted to the desired loads.

Further, in the power packet generation device according to the present invention, when a differential voltage occurs between the target voltage and the voltage estimated as being applied to each of the plurality of loads, the selector may set each packet generator in either the generation state or the non-generation state, based on the differential voltage between the target voltage and the voltage estimated as being applied to each of the plurality of loads.

According to the above configuration, the selector sets each packet generator in either the generation state or the non-generation state so that the power packet is supplied to, among the plurality of loads, a load whose differential voltage between the target voltage and the voltage estimated as being applied thereto is greater. Thereby, the voltages applied to the two loads can be changed at voltages relatively close to the target voltage.

Further, in the power packet generation device according to the present invention, each packet generator may include a control signal generator configured to generate a control signal that causes the switches to perform ON/OFF operation based on the current target voltage and the target voltage obtained in the past.

According to the above configuration, in the case where the target voltage changes with time, the voltage actually applied to the load can be made to follow the change in the target voltage.

Further, a power network according to the present invention may include the above power packet generation device.

Further, a power router according to the present invention includes: at least one power storage section configured to store electric power of a received power packet; and a power packet generation section configured to generate power packets to be supplied to a plurality of loads, from electric power supplied from the at least one power storage section, and transmit the generated power packets to a main transmission line so that target voltages are applied to the respective loads. The power packet generation section includes a plurality of switches, a plurality of packet generators, and a selector. The plurality of switches are respectively interposed in a plurality of sub transmission lines each connecting the power storage section to the main transmission line. The plurality of packet generators cause the switches to perform ON/OFF operation, based on the target voltages, and voltages estimated as being applied to the respective loads in each of a first state where the power packets are supplied to the loads and a second state where the power packets are not supplied to the loads. Thereby, the plurality of packet generators generate the power packets. The selector performs switching between a state where the packet generator causes the switches to perform ON/OFF operation, and a state where the packet generator maintains the switches in their OFF states.

Further, in the power router according to the present invention, the plurality of packet generators may be provided in one-to-one correspondence to the plurality of switches. The selector may set any one of the plurality of packet generators in a generation state where the packet generator generates the power packet by causing the switches to perform ON/OFF operation, and set all the other packet generators in a non-generation state where the packet generators do not generate the power packets by maintaining the switches in their OFF states.

Further, in the power router according to the present invention, when a differential voltage occurs between the target voltage and the voltage estimated as being applied to each of the plurality of loads, the selector may set each packet generator in either the generation state or the non-generation state, based on the differential voltage between the target voltage and the voltage estimated as being applied to each of the plurality of loads.

Further, in the power router according to the present invention, each packet generator may include a control signal generator configured to generate a control signal that causes the switches to perform ON/OFF operation based on the current target voltage and the target voltage obtained in the past.

Further, a power network according to the present invention may include the above power router.

Advantageous Effects of Invention

According to the present invention, the selector performs switching between the state where the packet generators control ON/OFF of the switches and the state where the packet generators do not control ON/OFF of the switches. Thereby, when the packet generators control ON/OFF of any one of the plurality of switches, the other switches can be maintained in the state where the switches are not ON/OFF controlled. Therefore, even in the configuration in which a plurality of power packets are transmitted to one main transmission line, the waveforms of the power packets are prevented from being deformed.

BRIEF DESCRIPTION OF DRAWINGS

FIG. 7A shows a state where a power packet is supplied to the load. FIG. 7B shows a state where no power packet is supplied to the load.

FIG. 16B shows a graph for a second condition.

DESCRIPTION OF EMBODIMENTS

Embodiment 1

<1> Configuration
<1-1> Overall Configuration

Figure 1:
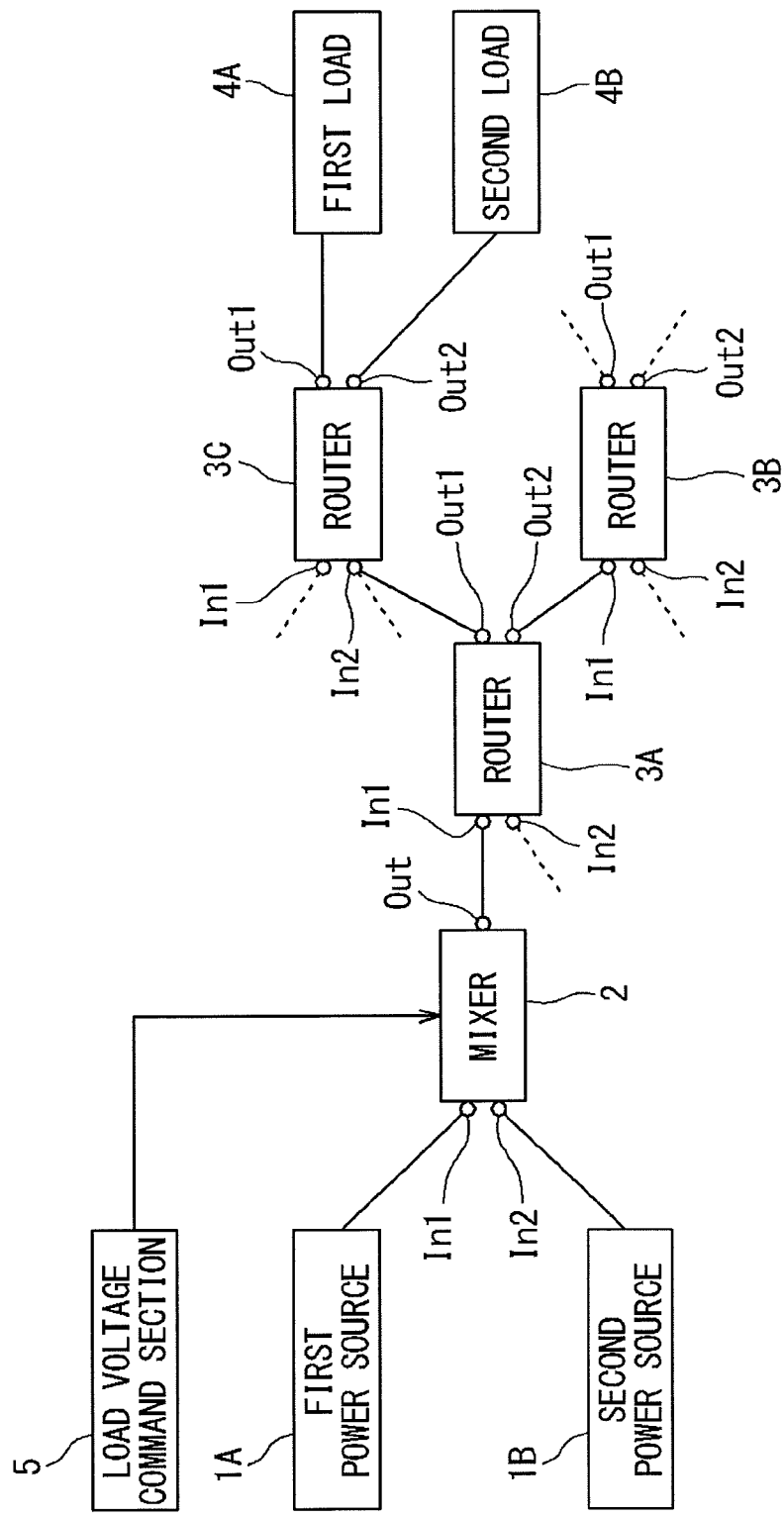
FIG. 1 is a configuration diagram of a power network according to Embodiment 1.

FIG. 1 shows a configuration diagram of a power network according to the present embodiment.

The power network includes power sources 1A, 1B, a mixer 2, power routers 3A, 3B, 3C, loads 4A, 4B, and a load voltage command section 5.

The power sources 1A, 1B (hereinafter also referred to as "first power source 1A", "second power source 1B" in some cases) each output DC power. The power sources 1A, 1B are each composed of a power plant, a battery, or the like.

Examples of the power plant include a thermal power station, and the like. Examples of the battery include a battery, an electric double layer capacitor, and the like.

The mixer 2 generates power packets for the loads 4A, 4B, based on the DC powers supplied from the power sources 1A, 1B, and transmits the power packets toward the power router 3A. The mixer 2 has two reception ports In1, In2, and an output from the power source 1A 1B is separated to be inputted to the two reception ports In1, In2. The destinations of the power packets generated in the mixer 2 are set to the addresses of the loads 4A, 4B. The configuration of the mixer 2 and the structure of each power packet will be described later in detail.

Each of the power routers 3A, 3B, 3C, upon receiving a power packet at either of the reception ports In1 and In2, performs routing in accordance with the destination of the received power packet. Then, each of the power routers 3A, 3B, 3C transmits the power packet from transmission ports Out1, Out2 in accordance with the result of the routing. Each of the power routers 3A, 3B, 3C includes a power storage section (not shown), and temporarily stores the received power packet in the power storage section, and thereafter, reconstitutes the power packet based on the power stored in the power storage section and transmits the power packet. Each of the power routers 3A, 3B, 3C can be regarded as internally having the same function as the mixer 2, in terms of the characteristic of reconstituting the power packet. In this sense, it can be said that the power storage section is in the same position as the power sources 1A, 1B for the mixer 2.

Examples of the loads 4A, 4B (hereinafter also referred to as "first load 4A", "second load 4B" in some cases) include a household appliance, a computer, a lighting device, and the like.

The load voltage command section 5 outputs voltages (target voltages) to be applied to the loads 4A, 4B. The load voltage command section 5 is composed of a personal computer, for example. The target voltages outputted from the load voltage command section 5 are inputted to the mixer 2.

Figure 2:
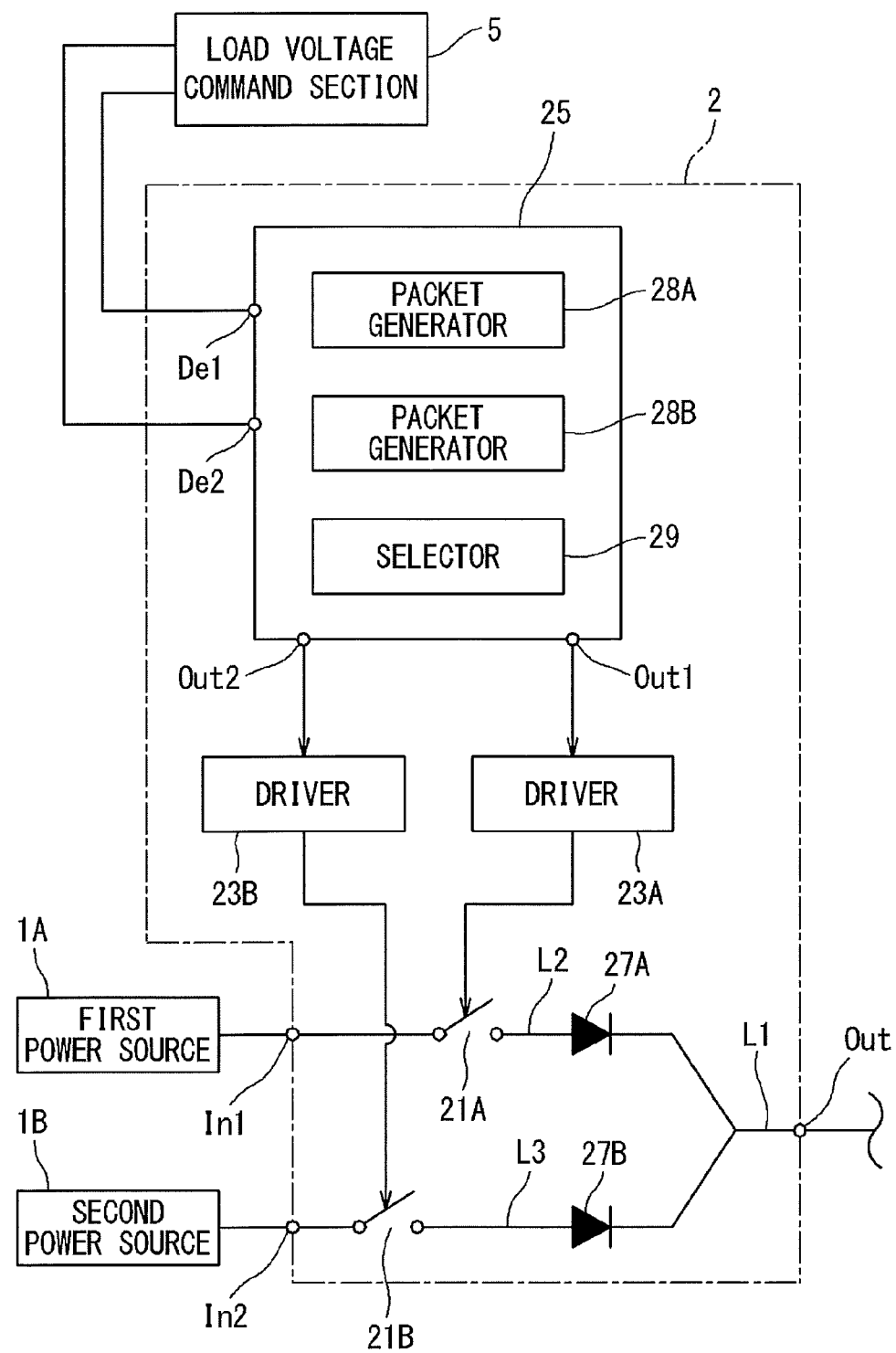
FIG. 2 is a block diagram of a part of the power network according to Embodiment 1.

FIG. 2 is a block diagram of a part of the power network according to the present embodiment.

The mixer 2 includes switches 21A, 21B, drivers 23A, 23B, a control section 25, and diodes 27A, 27B.

The switch 21A has one end connected to the first power source 1A, and the other end connected to a transmission port Out via the diode 27A. In other words, the switch 21A is interposed in a sub transmission line L2 connecting the power source 1A to a main transmission line L1 that passes through the transmission port Out.

The switch 21B has one end connected to the second power source 1B, and the other end thereof is connected to the transmission port Out via the diode 27B. In other words, the switch 21B is interposed in a sub transmission line L3 connecting the second power source 1B to the main transmission line L1 that passes through the transmission port Out.

The switches 21A, 21B each are composed of a normally-on type SiC-JFET, or the like. The switches 21A, 21B each are in its on state when a gate voltage is equal to or less than a turn-on voltage, and in its off state when the gate voltage is greater than the turn-on voltage.

The diode 27A is connected so as to have an anode on the switch 21A side and a cathode on the transmission port Out side. The diode 27B is connected so as to have an anode on the switch 21B side, and a cathode on the transmission port Out side.

The diodes 27A, 27B prevent current from flowing from the transmission port OUT toward the reception ports In1, In2.

The drivers 23A, 23B change the gate voltages of the switches 21A, 21B in accordance with control signals inputted from the control section 25. Each control signal is in either one of two types of voltages, i.e., a "High" level voltage and a "Low" level voltage. When the control signals are at the "High" level, the drivers 23A, 23B set the gate voltages of the switches 21A, 21B to be equal to or less than the turn-on voltage. When the control signals are at the "Low" level, the drivers 23A, 23B set the gate voltages of the switches 21A, 21B to be greater than the turn-on voltage.

The control section 25 includes packet generators 28A, 28B, and a selector 29. The packet generators 28A, 28B and the selector 29 are implemented by combining a timer, an FPGA (Field Programmable Gate Array), a memory, and the like, for example. The configuration of the control section 25 will be described later in detail.

The control section 25 inputs the control signals to the drivers 23A, 23B, based on command values (target voltages) inputted from the load voltage command section 5 to input terminals De1, De2. Thereby, the switches 21A, 21B are operated, and a power packet based on the electric power supplied from the first power source 1A or the second power source 1B is generated.

Figures 3A, 3B:
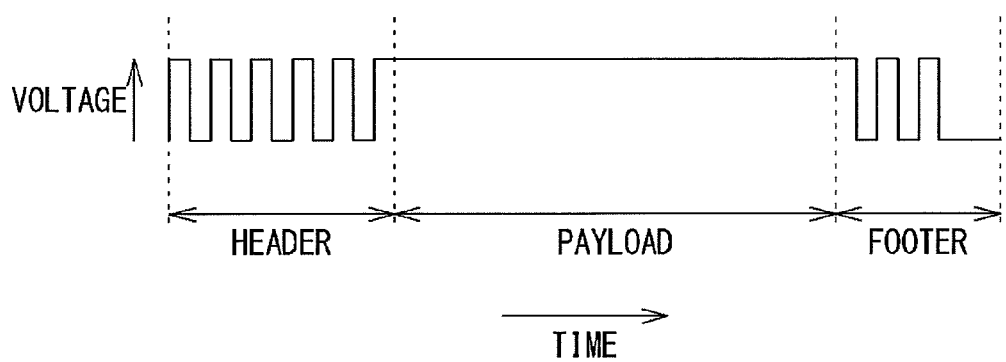
FIG. 3A shows a diagram illustrating a waveform of a power packet according to Embodiment 1.
FIG. 3B shows a diagram illustrating the structure of a header.

FIG. 3A is a diagram illustrating a waveform of a power packet according to the present embodiment, and FIG. 3B is a diagram illustrating the structure of a header included in the power packet.

When the switches 21A, 21B are operated, a power packet having the waveform shown in FIG. 3A is generated. The power packet is composed of a payload that carries electric power to be transmitted, a header added before the payload, and a footer added after the payload.

The header and the footer are fields indicating control information in the power packet. As shown in FIG. 3B, the header is configured to include, as the control information, a start signal indicating start of the power packet, transmission source information, and transmission source address, for example. The footer is configured to include, as the control information, an end signal indicating end of the power packet. The transmission source information is information indicating the type of a power source which is the transmission source (power source 1A or 1B) of the power packet. The type of the power source is based on whether it is a commercial power source or a self-generating power source. Alternatively, the type of the power source may be based on difference in power generation modes, such as thermal power generation and the like. Further, as the transmission source information, identification information (address) that allows unique identification of the power sources 1A, 1B may be adopted.

<1-2> Configuration of Control Section

Next, the configuration of the control section 25 will be described in detail.

Figure 4:
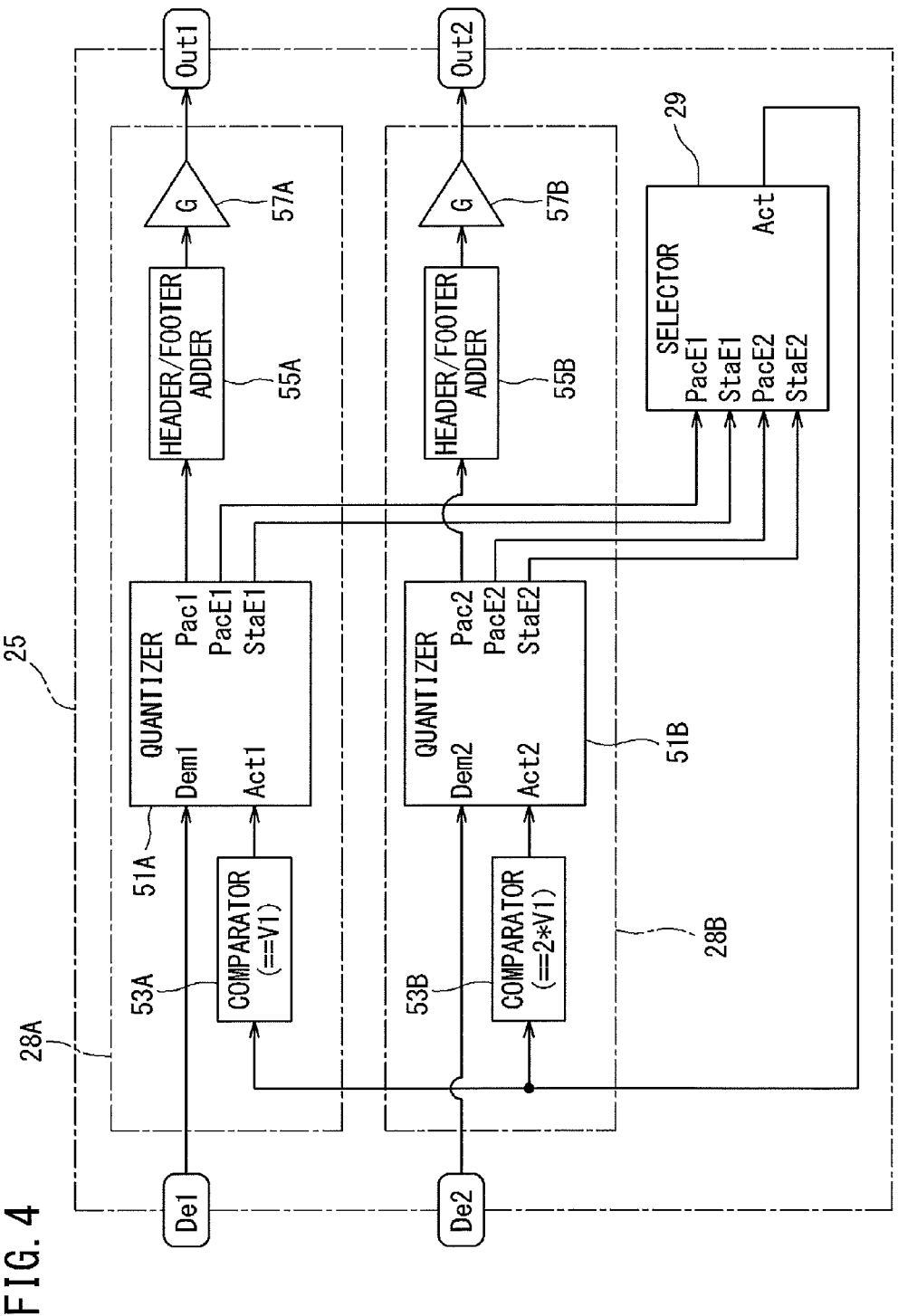
FIG. 4 is a block diagram of a control section according to Embodiment 1.

FIG. 4 shows a block diagram of the control section 25.

As described above, the control section 25 includes the packet generators 28A, 28B, and the selector 29. The configuration of the selector 29 will be described later in detail.

<Packet Generator>

The packet generators 28A, 28B generate control signals to be provided to the drivers 23A, 23B, based on target voltages provided from the load voltage command section 5. The control signals are configured to determine patterns of ON/OFF operation of the switches 21A, 21B.

That is, the packet generators 28A, 28B control the operations of the drivers 23A, 23B and the switches 21A, 21B in accordance with the control signals, thereby intermittently controlling supply of DC powers from the power sources 1A, 1B to the main transmission line L1.

The packet generators 28A, 28B generate the control signals for generating power packets like the power packet shown in FIG. 3, and provide the control signals to the drivers 23A, 23B. The drivers 23A, 23B and the switches 21A, 21B are operated in accordance with the control signals to generate the power packets.

Thus, the packet generators 28A, 28B have the function of generating the power packets by providing the drivers 23A, 23B with the control signals for generating the power packets.

The packet generator 28A includes a quantizer 51A, a comparator 53A, a header/footer adder 55A, and an amplifier 57A. The packet generator 28B includes a quantizer 51B, a comparator 53B, a header/footer adder 55B, and an amplifier 57B.

The quantizer 51A (51B) constitutes a control signal generator that generates a control signal for causing the switch 21A (21B) to perform ON/OFF operation. The quantizer 51A (51B) is a so-called dynamic quantizer. A dynamic quantizer determines a current quantized output value by use of past input information, and is distinguished from a so-called static quantizer that determines a current quantized output value based on a current input value. The quantizer 51A (51B) generates the control signal based on the target voltage obtained in the past. Therefore, in the case where the target voltage changes with time, the voltage actually applied to the load 4A, 4B can be made to follow the change in the target voltage.

The quantizer 51A (51B) includes a Dem1 (Dem2) terminal, a Pac1 (Pac2) terminal, a PacE1 (PacE2) terminal, a StaE1 (StaE2) terminal, and an Act1 (Act2) terminal. The target voltage is inputted from the load voltage command section 5 to the Dem1 (Dem2) terminal via the input terminal De1 (De2). The Pac1 (Pac2) terminal is connected to an output terminal Out1 (Out2) via the header/footer adder 55A (55B) and the amplifier 57A (57B), and the quantizer 51A (51B) outputs the generated control signal from the Pac1 (Pac2) terminal. The PacE1 (PacE2) terminal and the StaE1 (StaE2) terminal are connected to the selector 29. The quantizer 51A (51B) outputs, from the PacE1 (PacE2) terminal and the StaE1 (StaE2) terminal, a signal which allows the selector 29 to determine which one of the quantizers 51A and 51B should output the control signal. The comparator 53A (53B) is connected to the Act1 (Act2) terminal. When a voltage (hereinafter referred to as "H level voltage") equal to or greater than a predetermined threshold is inputted from the comparator 53A (53B), the quantizer 51A (51B) outputs the control signal.

As described above, the quantizers 51A and 51B are controlled, based on the selection by the selector 29, so that one of the quantizers 51A and 51B outputs the control signal, and the quantizer 51A (51B) outputs the control signal from the Pac1 (Pac2) terminal, based on the target voltage provided from the load voltage command section 5.

Figure 5:
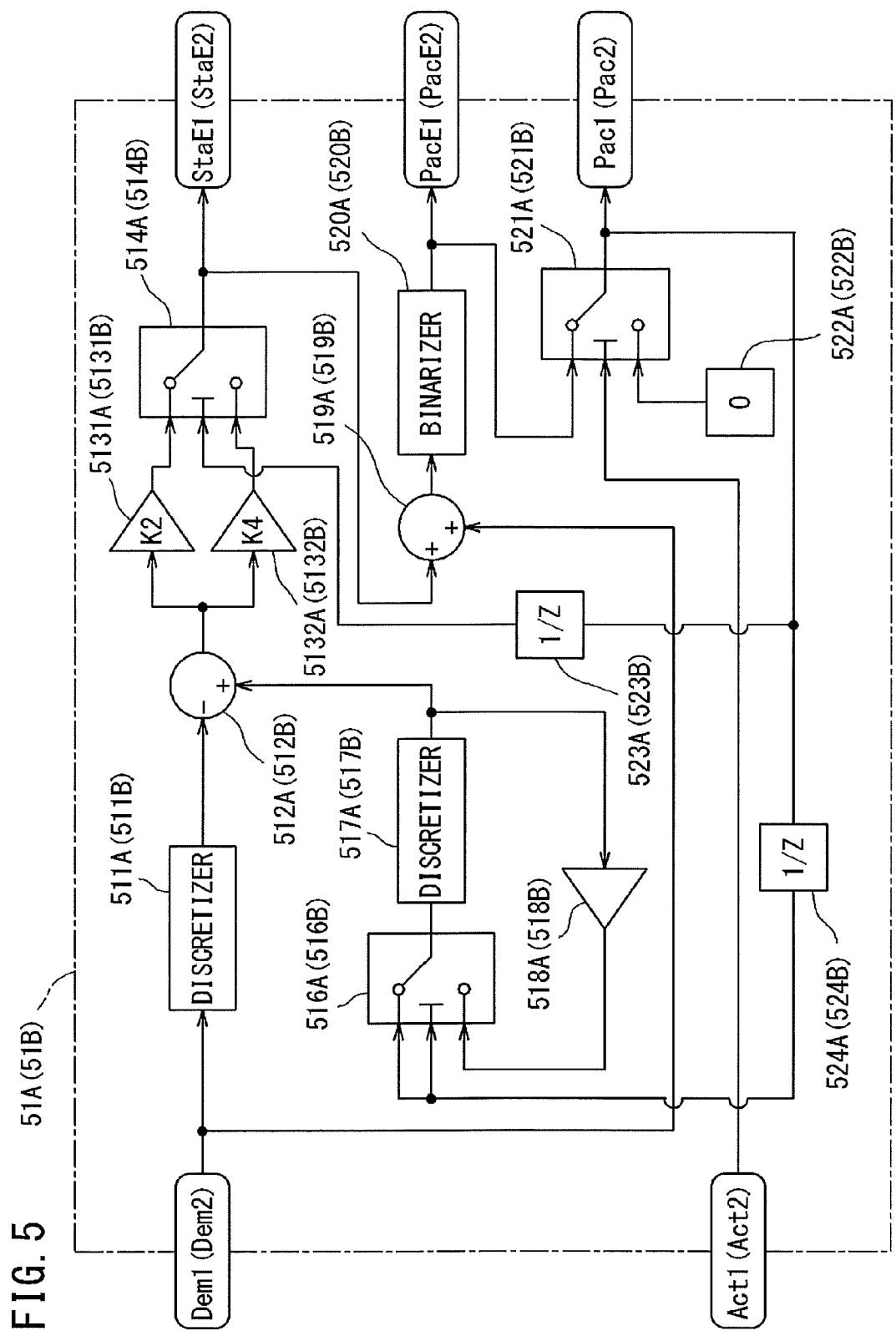
FIG. 5 is a block diagram of a quantizer according to Embodiment 1.

FIG. 5 shows a block diagram of the quantizer 51A (51B).

The quantizer 51A (51B) includes discretizers 511A (511B), 517A (517B), a differentiator 512A (512B), and amplifiers 5131A (5131B), 5132A (5132B), 518A (518B). Further, the quantizer 51A (51B) includes switches 514A (514B), 516A (516B), 521A (521B), an adder 519A (519B), a binarizer 520A (520B), an L level voltage output part 522A (522B), and delay units 523A (523B), 524A (524B).

The discretizer 511A (511B) outputs a voltage obtained by discretizing the target voltage provided from the Dem1 (Dem2) terminal. The discretizer 517A (517B) receives the control signal outputted from the switch 521A (521B) toward the Pac1 (Pac2) terminal or the voltage outputted from the amplifier 518A (518B), and outputs a voltage obtained by discretizing the control signal or the voltage.

The differentiator 512A (512B) outputs a differential voltage x (refer to "x1", "x2" in FIG. 9 described later, for example) obtained by subtracting the output voltage of the discretizer 511A (511B) from the output voltage of the discretizer 517A (517B).

The amplifiers 5131A (5131B), 5132A (5132B) each amplify the output voltage from the differentiator 512A (512B) to output the amplified voltage. The amplifier 5131A (5131B) and the amplifier 5132A (5132B) have different amplification factors. The amplifier 518A (518B) amplifies the output voltage from the discretizer 517A (517B), and provides the amplified voltage to the switch 516A (516B).

The switches 514A (514B), 516A (516B), 521A (521B) each have two input terminals and one drive terminal. In FIG. 5, among the three terminals, the uppermost terminal and the lowermost terminal are the input terminals, and the median terminal is the drive terminal. Hereinafter, regarding the switches 514A (514B), 516A (516B), 521A (521B), the input terminal on the upper side and the input terminal on the lower side, in the figure, are referred to as an upper input terminal and a lower input terminal, respectively. The switches 514A (514B), 516A (516B), 521A (521B) each switch a connection destination of its output terminal, between the upper input terminal and the lower input terminal, in accordance with the voltage at the drive terminal. Specifically, when the voltage at the drive terminal is the H level voltage, each switch switches the connection destination of the output terminal to the upper input terminal. When the voltage at the drive terminal is a voltage of about 0 V (hereinafter referred to as "L level voltage"), each switch switches the connection destination of the output terminal to the lower input terminal.

The upper input terminal of the switch 514A (514B) is connected to the output terminal of the amplifier 5131A (5131B), and the lower input terminal thereof is connected to the output terminal of the amplifier 5132A (5132B). The drive terminal of the switch 514A (514B) is connected to the output terminal of the switch 521A (521B) via the delay unit 523A (523B). The output terminal of the switch 514A (514B) is connected to the StaE1 (StaE2) terminal. A signal outputted from the switch 514A (514B) corresponds to a voltage in which a differential voltage ΔV between the target voltage and a voltage estimated as being applied to the load 4A (4B) is reflected.

The quantizer 51A (51B) outputs, from the StaE1 (StaE2) terminal, a signal having the absolute value of the signal outputted from the switch 514A (514B). That is, the differential voltage ΔV is a signal having the absolute value of the signal outputted from the switch 514A (514B).

The "voltage estimated as being applied" and the "differential voltage ΔV" will be described later in detail.

The upper input terminal of the switch 516A (516B) is connected to the output terminal of the switch 521A (521B) via the delay unit 524A (524B), and the lower input terminal thereof is connected to an output terminal of the amplifier 518A (518B). The drive terminal of the switch 516A (516B) is also connected to the output terminal of the switch 521A (521B) via the delay unit 524A (524B). The delay units 523A (523B), 524A (524B) are used to make the input terminal switching timings of the switch 514A (514B) and the switch 516A (516B) coincide with each other. The delay units 523A (523B), 524A (524B) each give a time delay corresponding to one power packet, to the control signal outputted from the switch 521A (521B) to the Pac1 (Pac2) terminal (and the switch 516A (516B)).

That is, the switches 514A (514B), 516A (516B) are configured to be switched to the upper input terminal or the lower input terminal at the same timing.

The upper input terminal of the switch 521A (521B) is connected to an output terminal of the binarizer 520A (520B), and the lower input terminal thereof is connected to the L level voltage output part 522 that outputs the L level voltage. The L level voltage output part 522 can be implemented by grounding the lower input terminal, for example. The output terminal of the switch 521A (521B) is connected to the Pac1 (Pac2) terminal. The drive terminal of the switch 521A (521B) is connected to the Act1 (Act2) terminal.

The quantizer 51A (51B) outputs the control signal from the Pac1 (Pac2) terminal while the switch 521A (521B) is connected to the upper input terminal.

The H level voltage or the L level voltage outputted from the comparator 53A (53B) is provided to the Act1 (Act2) terminal, as described later. The switch 512A is controlled by the H level voltage or the L level voltage from the comparator 53A (53B).

The adder 519A (519B) outputs a voltage obtained by adding the target voltage inputted from the Dem1 (Dem2) terminal to the output voltage from the switch 514A (514B).

The binarizer 520A (520B) binarizes the output voltage from the adder 519A (519B), and outputs the binarized voltage. The output terminal of the binarizer 520A (520B) is connected to the PacE1 (PacE2) terminal.

With the above-described configuration, when the quantizer 51A (51B) is provided with the target voltage from the Dem1 (Dem2) terminal, the quantizer 51A (51B) generates the control signal based on the value of the target voltage. Further, the quantizer 51A (51B) outputs the generated control signal from the Pac1 (Pac2) terminal or suspends outputting of the control signal, in accordance with the determination result of the selector 29.

Referring back to FIG. 4, the comparators 53A, 53B change the voltages to be applied to the Act1, Act2 terminals of the quantizers 51A, 51B in accordance with the voltage inputted from the selector 29.

The comparator 53A is connected to the Act1 terminal of the quantizer 51A. The comparator 53A determines whether or not the voltage inputted from the selector 29 is a voltage V1. The comparator 53A inputs the H level voltage to the Act1 terminal when the voltage is equal to the voltage V1, and inputs the L level voltage to the Act1 terminal when the voltage is not equal to the voltage V1. The phrase "equal to the voltage V1" does not require that the voltage inputted from the selector 29 should be exactly equal to the voltage V1, but means that the voltage inputted from the selector 29 may be within a predetermined voltage range including the voltage V1 (for example, within a range of ±25% with respect to the voltage V1).

The comparator 53B is connected to the Act2 terminal of the quantizer 51B. The comparator 53B determines whether or not the voltage inputted from the selector 29 is a voltage 2*V1. The comparator 53B outputs the H level voltage to the Act2 terminal when the voltage is equal to the voltage 2*V1, and outputs the L level voltage to the Act2 terminal when the voltage is not equal to the voltage 2*V1. The phrase "equal to the voltage 2*V1" does not require that the voltage inputted from the selector 29 should be exactly equal to the voltage 2*V1, but means that the voltage inputted from the selector 29 may be within a predetermined voltage range including the voltage 2*V1 (for example, within a range of ±25% with respect to the voltage 2*V1). The symbol "*" means multiplication.

The quantizers 51A, 51B (packet generators 28A, 28B) each output the control signal when provided with the H level voltage, and suspend outputting of the control signal when provided with the L level voltage.

The selector 29, by providing the comparators 53A, 53B with the above-described voltages, controls the quantizers 51A, 51B (packet generators 28A, 28B) so that one of the quantizers 51A, 51B outputs the control signal while the other quantizer outputs the L level voltage.

The header/footer adders 55A, 55B add headers and footers to the control signals outputted from the quantizers 51A, 51B. The header/footer adder 55A adds a header configured to include, for example, transmission source information indicating the type of the first power source 1A, and transmission destination address indicating the first load 4A. The header/footer adder 55B adds a header configured to include, for example, transmission source information indicating the type of the second power source 1B, and transmission destination address indicating the second load 4B.

Thus, the packet generators 28A, 28B generate the control signals that enable generation of power packets like the power packet shown in FIG. 3.

The amplifiers 57A, 57B raise the control signals up to driving voltages of the drivers 23A, 23B. The amplifiers 57A, 57B amplify the control signals inputted from the header/footer adders 55A, 55B, and output the amplified control signals to the output terminals Out1, Out2.

<Selector>

The selector 29 performs switching between a state where the packet generator 28A (28B) causes the switch 21A (21B) to perform ON/OFF operation and a state where the packet generator 28A (28B) maintains the switch 21A (21B) in its OFF position.

That is, the selector 29 selects either a state where the packet generator 28A (28B) is caused to output a control signal which makes the switch 21A perform ON/OFF operation, thereby generating a power packet (generation state) or a state where the packet generator 28A (28B) is caused to output the L level voltage which maintains the switch 21B in its OFF position, thereby generating no power packet (non-generation state).

The selector 29 performs switching so that the packet generator 28B is in the non-generation state when the packet generator 28A is in the generation state, and the packet generator 28B is in the generation state when the packet generator 28A is in the non-generation state.

The selector 29 includes a PacE1 terminal, a StaE1 terminal, a PacE2 terminal, a StaE2 terminal, and an Act terminal. The PacE1 terminal and the StaE1 terminal are connected to the PacE1 terminal and the StaE1 terminal of the quantizer 51A, respectively. The PacE2 terminal and the StaE2 terminal are connected to the PacE2 terminal and the StaE2 terminal of the quantizer 51B, respectively. The Act terminal is connected to the comparators 53A, 53B.

Figure 6:
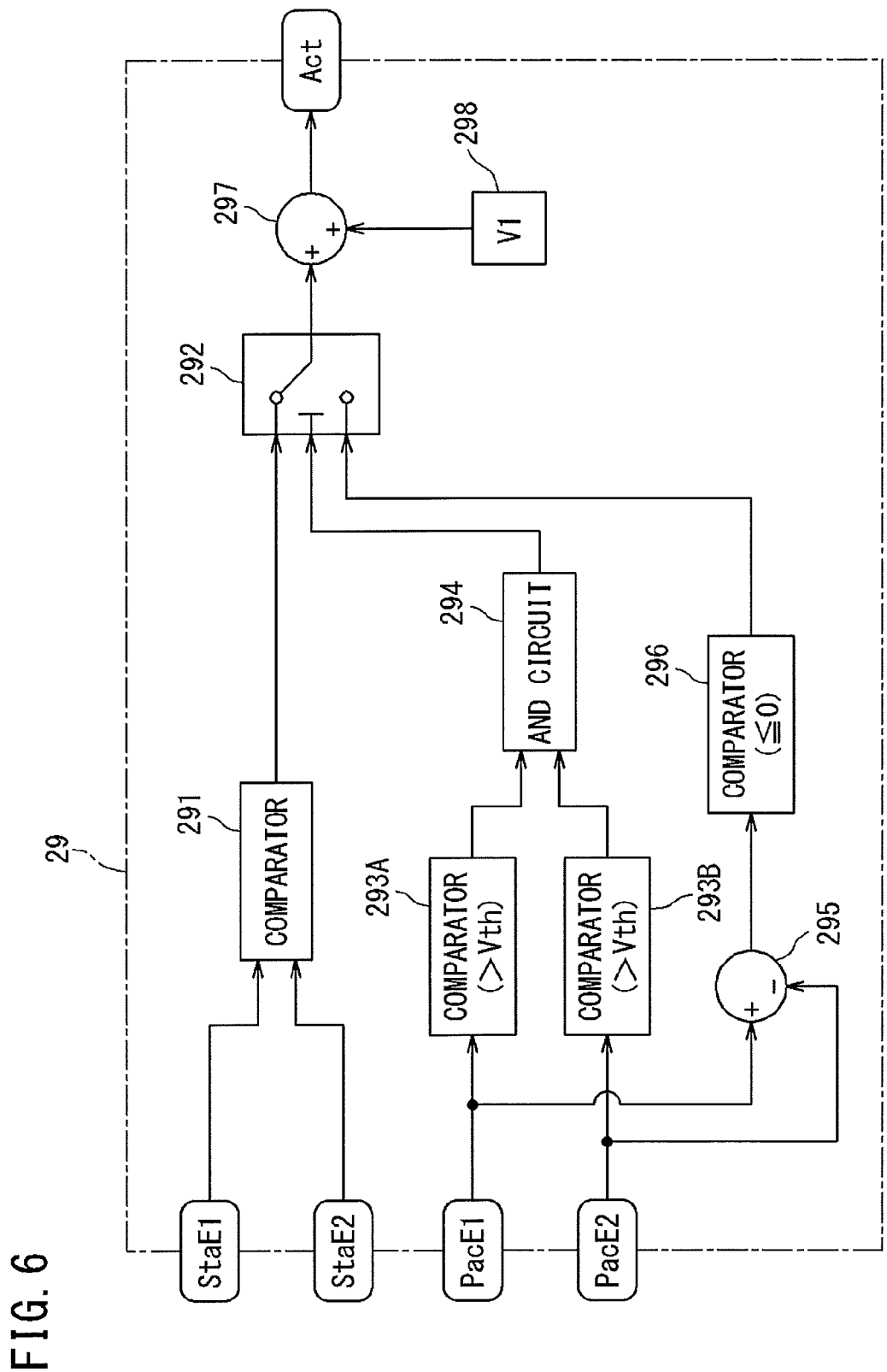
FIG. 6 is a block diagram of a selector according to Embodiment 1.

FIG. 6 shows a block diagram of the selector 29.

The selector 29 includes comparators 291, 293A, 293B, 296, a switch 292, an AND circuit 294, a differentiator 295, an adder 297, and a constant voltage source 298.

The comparator 291 has two input terminals, and one of the input terminals is connected to the StaE1 terminal while the other input terminal is connected to the StaE2 terminal. The voltage at the StaE1 terminal is a voltage in which a differential voltage ΔV1 between the target voltage and the voltage estimated as being applied to the load 4A is reflected. The voltage at the StaE2 terminal is a voltage in which a differential voltage ΔV2 between the target voltage and the voltage estimated as being applied to the load 4B is reflected. Hereinafter, the differential voltage ΔV provided to the StaE1 terminal by the quantizer 51A is represented as a differential voltage ΔV1, and the differential voltage Δ provided to the StaE2 terminal by the quantizer 51B is represented as a differential voltage ΔV2.

The comparator 291 outputs a low level voltage when the voltage at the StaE1 terminal is equal to or greater than the voltage at the StaE2 terminal, that is, when the differential voltage ΔV1 corresponding to the load 4A is equal to or greater than the differential voltage ΔV2 corresponding to the load 4B. On the other hand, the comparator 291 outputs a high level voltage whose voltage value is greater than the voltage value of the low level voltage when the voltage at the StaE1 terminal is less than the voltage at the StaE2 terminal, that is, when the differential voltage ΔV1 corresponding to the load 4A is less than the differential voltage ΔV2 corresponding to the load 4B. The respective functional sections of the selector 29 are configured to exchange the high level voltage and the low level voltage with each other.

The comparators 293A, 293B are connected to the PacE1 terminal, PacE2 terminal, respectively. The comparators 293A, 293B output the high level voltage when the voltages at the PacE1 terminal, PacE2 terminal exceed a predetermined threshold voltage Vth, respectively. The threshold voltage Vth is a voltage higher than the low level voltage and lower than the high level voltage. For example, the threshold voltage Vth is set at 0 V.

The case where the voltage at the PacE1 terminal exceeds the threshold voltage Vth corresponds to the case where the quantizer 51A generates the control signal. The case where the voltage at the PacE2 terminal exceeds the threshold voltage Vth corresponds to the case where the quantizer 51B generates the control signal. That is, the comparators 293A, 293B determine whether or not the quantizers 51A, 51B generate the control signals, respectively.

The AND circuit 294 has two input terminals which are connected to the output terminals of the comparators 293A, 293B, respectively. The case where the output voltage from the AND circuit 294 is at the high level voltage corresponds to the case where the output voltages from both the comparators 293A, 293B are at the high level voltage. That is, the case where the output voltage from the AND circuit 294 is at the high level voltage corresponds to the case where both the quantizer 51A and the quantizer 51B generate the control signals. On the other hand, the case where the output voltage from the AND circuit 294 is at the low level voltage corresponds to the case where the output voltage from at least one of the comparators 293A and 293B is at the low level voltage. That is, the case where the output voltage from the AND circuit 294 is at the low level voltage corresponds to the case where at least one of the quantizer 51A and the quantizer 51B does not generate the control signal. That is, the AND circuit 294 determines whether or not both the quantizer 51A and the quantizer 51B generate the control signals.

The differentiator 295 outputs a differential voltage (x1$q$–x2$q$) obtained by subtracting the voltage at the PacE2 terminal from the voltage at the PacE1 terminal.

The comparator 296 outputs the high level voltage when the output voltage from the differentiator 295 is equal to or less than 0 V, and outputs the low level voltage when the output voltage from the differentiator 295 exceeds 0 V. That is, the comparator 296 outputs the high level voltage when the voltage at the PacE1 terminal is equal to or less than the voltage at the PacE2 terminal. On the other hand, the comparator 296 outputs the low level voltage when the voltage at the PacE1 terminal exceeds the voltage at the PacE2 terminal.

That is, the comparator 296 outputs the low level voltage when the quantizer 51A generates the control signal and the quantizer 51B does not generate the control signal. On the other hand, the comparator 296 outputs the high level voltage when the quantizer 51A does not generate the control signal and the quantizer 51B generates the control signal.

The switch 292 includes two input terminals and one drive terminal. In FIG. 6, among the three terminals, the uppermost terminal and the lowermost terminal are the input terminals, and the median terminal is the drive terminal. Hereinafter, regarding the switch 292, the input terminal on the upper side and the input terminal on the lower side, in the figure, are referred to as an upper input terminal and a lower input terminal, respectively. The switch 292 switches a connection destination of its output terminal, between the upper input terminal and the lower input terminal, in accordance with the voltage at the drive terminal. Specifically, when the voltage at the drive terminal is the high level voltage, the switch 292 switches the connection destination of the output terminal to the upper input terminal. When the voltage at the drive terminal is the low level voltage, the switch 292 switches the connection destination of the output terminal to the lower input terminal.

The upper input terminal of the switch 292 is connected to the output terminal of the comparator 291, and the lower input terminal thereof is connected to the output terminal of the comparator 296. The drive terminal of the switch 292 is connected to the output terminal of the AND circuit 294. The output terminal of the switch 292 is connected to the adder 297.

The switch 292 switches the connection destination of the output terminal to the upper input terminal when the output voltage from the AND circuit 294 is the high level voltage, that is, when both the quantizers 51A and 51B generate the control signals. On the other hand, the switch 292 switches the connection destination of the output terminal to the lower input terminal when the output voltage from the AND circuit 294 is the low level voltage, that is, when at least one of the quantizers 51A and 51B does not generate the control signal.

The adder 297 outputs, to the Act terminal, a voltage obtained by adding the output voltage from the switch 292 to the output voltage from the reference voltage source 298. The output voltage from the reference voltage source 298 is the voltage V1. The voltage V1 corresponds to the high level voltage outputted from the comparator 291.

With the above-described configuration, when both the quantizers 51A and 51B generate the control signals, the selector 29 outputs, from the Act terminal, a voltage obtained by adding the voltage V1 to the voltage outputted from the comparator 291.

The comparator 291 outputs the low level voltage when the voltage (differential voltage ΔV1) inputted from the StaE1 terminal of the quantizer 51A is equal to or greater than the voltage (differential voltage ΔV2) inputted from the StaE2 terminal of the quantizer 51B. Then, a voltage having a magnitude of V1 is outputted from the Act terminal of the selector 29.

On the other hand, the comparator 291 outputs the high level voltage when the voltage (differential voltage ΔV1)

inputted from the StaE1 terminal of the quantizer 51A is less than the voltage (differential voltage ΔV2) inputted from the StaE2 terminal of the quantizer 51B. Then, a voltage having a magnitude of 2*V1 is outputted from the Act terminal of the selector 29.

In the case where both the quantizers 51A and 51B generate the control signals, since the AND circuit 294 provides the high level voltage to the switch 292, the switch 292 is switched to the upper input terminal. Therefore, as described above, the selector 29 outputs, from the Act terminal, the voltage obtained by adding the voltage V1 to the voltage outputted from the comparator 291.

In this case, when the differential voltage ΔV1 of the quantizer 51A is equal to or greater than the differential voltage ΔV2 of the quantizer 51B, the selector 29 outputs, from the Act terminal, the voltage having the magnitude of V1, as described above.

When the differential voltage ΔV1 of the quantizer 51A is less than the differential voltage ΔV2 of the quantizer 51B, the selector 29 outputs, from the Act terminal, the voltage having the magnitude of 2*V1, as described above.

On the other hand, in the case where at least one of the quantizers 51A and 51B does not generate the control signal, since the AND circuit 294 provides the low level voltage to the switch 292, the switch 292 is switched to the lower input terminal. Thus, the selector 29 outputs, from the Act terminal, a voltage obtained by adding the voltage V1 to the voltage outputted from the comparator 296.

The comparator 296 outputs the low level voltage when the quantizer 51A generates the control signal and the quantizer 51B does not generate the control signal. In this case, the selector 29 outputs the voltage having the magnitude of V1 from the Act terminal.

On the other hand, the comparator 296 outputs the high level voltage when the quantizer 51A does not generate the control signal and the quantizer 51B generates the control signal. In this case, the selector 29 outputs the voltage having the magnitude of 2*V1 from the Act terminal.

Thus, the selector 29 sets the packet generators 28A, 28B in either the generation state or the non-generation state described above. Specifically, the selector 29 sets the packet generator 28A in the generation state, and sets the packet generator 28B in the non-generation state. Alternatively, the selector 29 sets the packet generator 28A in the non-generation state, and sets the packet generator 28B in the generation state.

In the case where at least one of the quantizers 51A and 51B does not generate the control signal, since no collision occurs between the power packets transmitted to the main transmission line L1, the selector 29 performs control so that the control signal generated by either of the quantizers 51A and 51B is outputted as it is.

On the other hand, in the case where both the quantizers 51A and 51B generate the control signals because the packet generators 28A and 28B are respectively provided with the target voltages, collision may occur between the power packets generated by the packet generators 28A and 28B.

In this case, the selector 29 of the present embodiment performs control so that either of the quantizers 51A and 51B outputs the control signal.

When the voltage at the Act terminal is V1, since the comparator 53A provides the H level voltage to the quantizer 51A, the quantizer 51A outputs the control signal. In addition, when the voltage at the Act terminal is V1, since the comparator 53B provides the L level voltage to the quantizer 51B, the quantizer 51B does not output the control signal.

On the other hand, when the voltage at the Act terminal is 2*V1, since the comparator 53A provides the L level voltage to the quantizer 51, the quantizer 51A does not output the control signal. In addition, when the voltage at the Act terminal is 2*V1, since the comparator 53B provides the H level voltage to the quantizer 51B, the quantizer 51B outputs the control signal.

As described above, when both the quantizers 51A, 51B generate the control signals, the selector 29 outputs the voltage having the magnitude of V1 from the Act terminal when the differential voltage ΔV1 of the quantizer 51A is equal to or greater than the differential voltage ΔV2 of the quantizer 51B, and outputs the voltage having the magnitude of 2*V1 from the Act terminal when the differential voltage ΔV1 of the quantizer 51A is less than the differential voltage ΔV2 of the quantizer 51B.

Therefore, the selector 29 causes the quantizer 51A to output the control signal when the differential voltage ΔV1 of the quantizer 51A is equal to or greater than the differential voltage ΔV2 of the quantizer 51B, and causes the quantizer 51B to output the control signal when the differential voltage ΔV1 of the quantizer 51A is less than the differential voltage ΔV2 of the quantizer 51B.

That is, in the case where both the quantizers 51A and 51B generate the control signals, the selector 29 changes the voltage at the Act terminal so that the control signal is outputted from only the quantizer 51A (51B) corresponding to the load 4A (4B) whose differential voltage ΔV1 (ΔV2) between the target voltage and the voltage estimated as being applied thereto is greater, between the quantizers 51A and 51B.

Specifically, it is assumed that, in each of the loads 4A and 4B, the differential voltage ΔV1 (ΔV2) occurs between the target voltage and the voltage estimated as being applied thereto. In this case, the selector 29 sets each of the packet generators 28A and 28B in the generation state or the non-generation state, based on the differential voltage ΔV1 (ΔV2) between the target voltage and the voltage estimated as being applied to each of the loads 4A and 4B. Specifically, the selector 29 sets each of the packet generators 28A and 28B in the generation state or the non-generation state so that the power packet is supplied to either of the loads 4A and 4B, whose differential voltage ΔV1(ΔV2) between the target voltage and the voltage estimated as being applied thereto is greater.

Thus, the voltages respectively applied to the two loads 4A and 4B can be changed at voltages relatively close to the target voltages.

As described above, in the case where both the quantizers 51A and 51B generate the control signals because both the packet generators 28A and 28B are provided with the target voltages, the selector 29 controls the quantizers 51A, 51B so that the control signal is outputted from only the quantizer 51A (51B) having the greater differential voltage ΔV1 (ΔV2), between the quantizers 51A and 51B.

Therefore, even in the case where both the quantizers 51A and 51B generate the control signals, the selector 29 can appropriately switch the quantizer caused to output the control signal, between the quantizer 51A and the quantizer 51B. As the result, the power packets generated by the packet generators 28A, 28B can be supplied to the loads 4A, 4B, respectively, so as to be approximated to the target voltages, while avoiding collision of the power packets.

<2> Operation of Control Section

Hereinafter, the operation of the control section 25 according to the present embodiment will be described.

The control section 25 estimates voltages applied to the loads 4A, 4B in a state (first state) where power packets are supplied to the loads 4A, 4B and in a state (second state) where no power packets are supplied to the loads 4A, 4B. At this time, the control section 25 estimates the voltage applied to the load 4A, 4B, based on an equivalent circuit including the load 4A, 4B, a capacitor for buffering which is connected in parallel to the load 4A, 4B, and a connection resistance, for example.

Figure 7A:
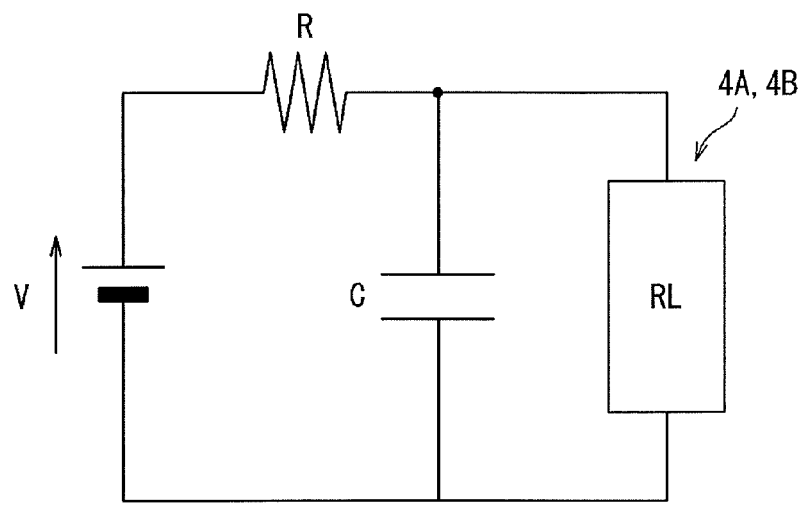
FIG. 7A is a circuit diagram of a load according to Embodiment 1.
Figure 7B:
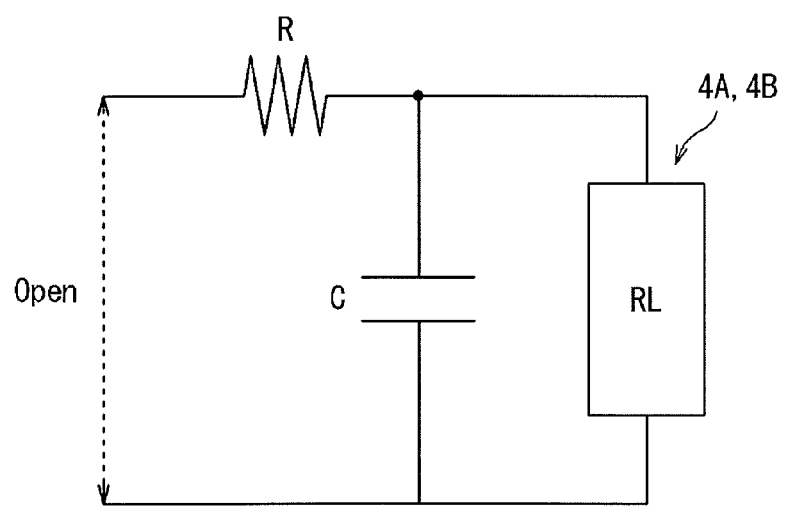
FIG. 7B is a circuit diagram of a load according to Embodiment 1.

FIGS. 7A and 7B show an example of the equivalent circuit of the load 4A (4B) assumed by the control section 25 according to the present embodiment. The equivalent circuit is composed of, for example, a resistor RL, a capacitor C connected in parallel to the resistor RL, and a resistor R connected in series to the resistor RL. The resistor RL corresponds to the load 4A (4B), the capacitor C corresponds to the capacitor for buffering, and the resistor R corresponds to the connection resistor. FIG. 7A shows a state where a power packet is supplied to the load 4A (4B). In FIG. 7A, this state is represented by a voltage V being applied between input terminals of the equivalent circuit. FIG. 7B shows a state where no power packet is supplied to the load 4A (4B). In FIG. 7B, this state is represented by the equivalent circuit being open between the input terminals.

The two states shown in FIGS. 7A and 7B are realized when a power packet is supplied to the load 4A (4B) and when no power packet is supplied to the load 4A (4B), respectively.

The control section 25 determines whether the state of the load 4A (4B) is the state shown in FIG. 7A or the state shown in FIG. 7B, based on the output from the switch 521A (521B) included in the control section 25.

That is, the switch 521A (521B) outputs the control signal when the packet generator 28A (28B) is in the generation state. On the other hand, the switch 521A (521B) does not output the control signal when the packet generator 28A (28B) is in the non-generation state.

Therefore, the control section 25 can determine whether or not the power packet has been provided to the load 4A (4B), depending on whether or not the switch 521A (512B) outputs the control signal.

The control section 25 performs switching between the later-described processes in accordance with the determination as to whether or not the power packet has been provided to the load 4A (4B).

Figure 8:
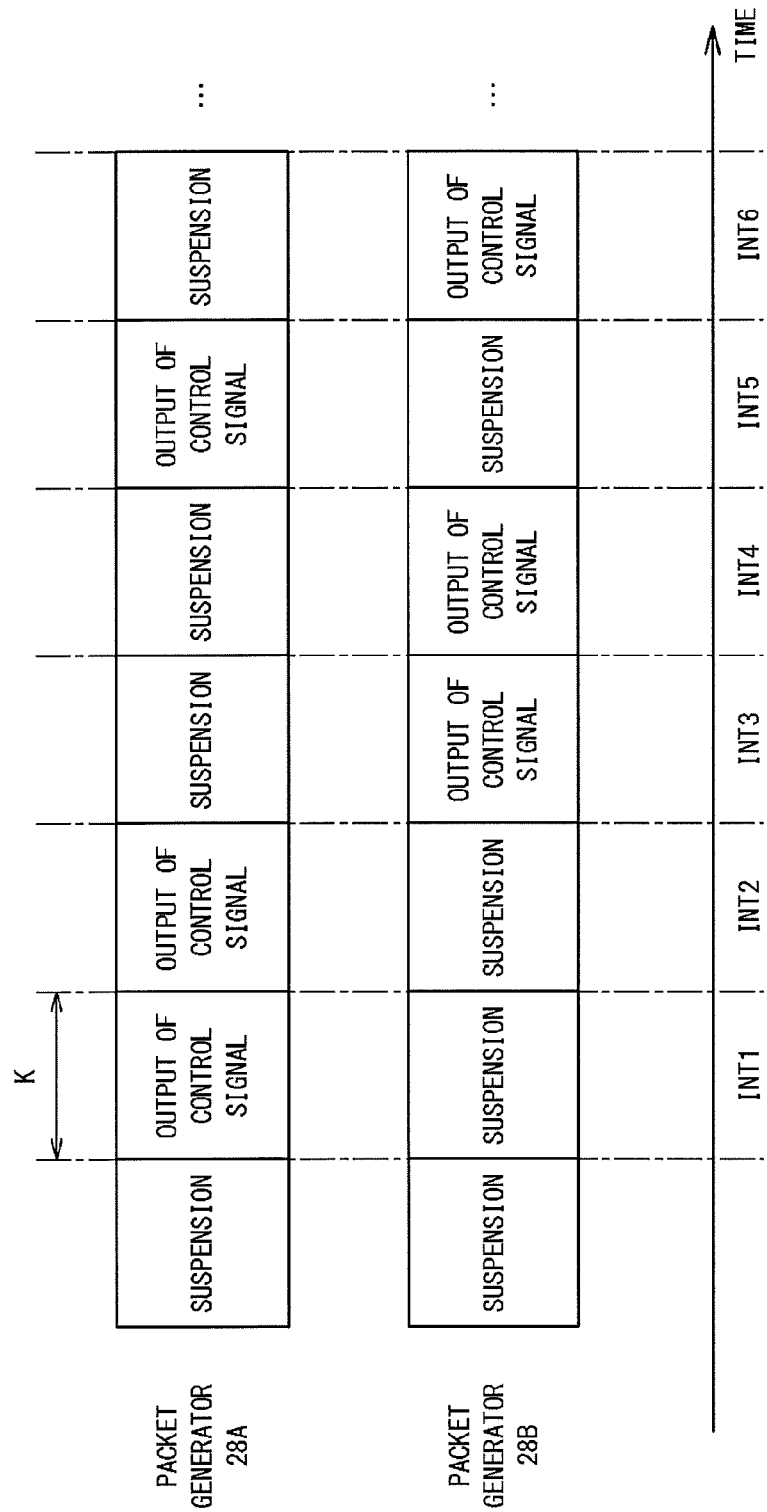
FIG. 8 shows time charts of operations of packet generators according to Embodiment 1.

FIG. 8 shows time charts of operations of the two packet generators 28A, 28B. In the following description, it is assumed that the two packet generators 28A, 28B are operated when the respective packet generators 28A, 28B are provided with the target voltages, as shown in FIG. 8. It is assumed that the operations of the two packet generators 28A, 28B change with a time interval K as a time unit. The time interval K corresponds to one power packet. Hereinafter, the time interval K is referred to as "one packet time".

First, the operation in a period INT1 shown in FIG. 8 will be described. The period INT1 is started when the selector 29 has determined that the output value (differential voltage ΔV1) from the switch 514A is greater than the output value (differential voltage ΔV2) from the switch 514B. That is, the period INT1 is started when it has been determined that the differential voltage ΔV1 between the target voltage and the voltage estimated as being applied to the load 4A is greater than the differential voltage ΔV2 between the target voltage and the voltage estimated as being applied to the load 4B.

The period INT1 corresponds to a period that follows its immediately preceding one-packet-time period in which neither the packet generators 28A nor 28B outputted the control signals. That is, the period INT1 corresponds to a period that follows its immediately preceding one-packet-time period in which the power packets were supplied to neither the loads 4A nor 4B.

Figure 9:
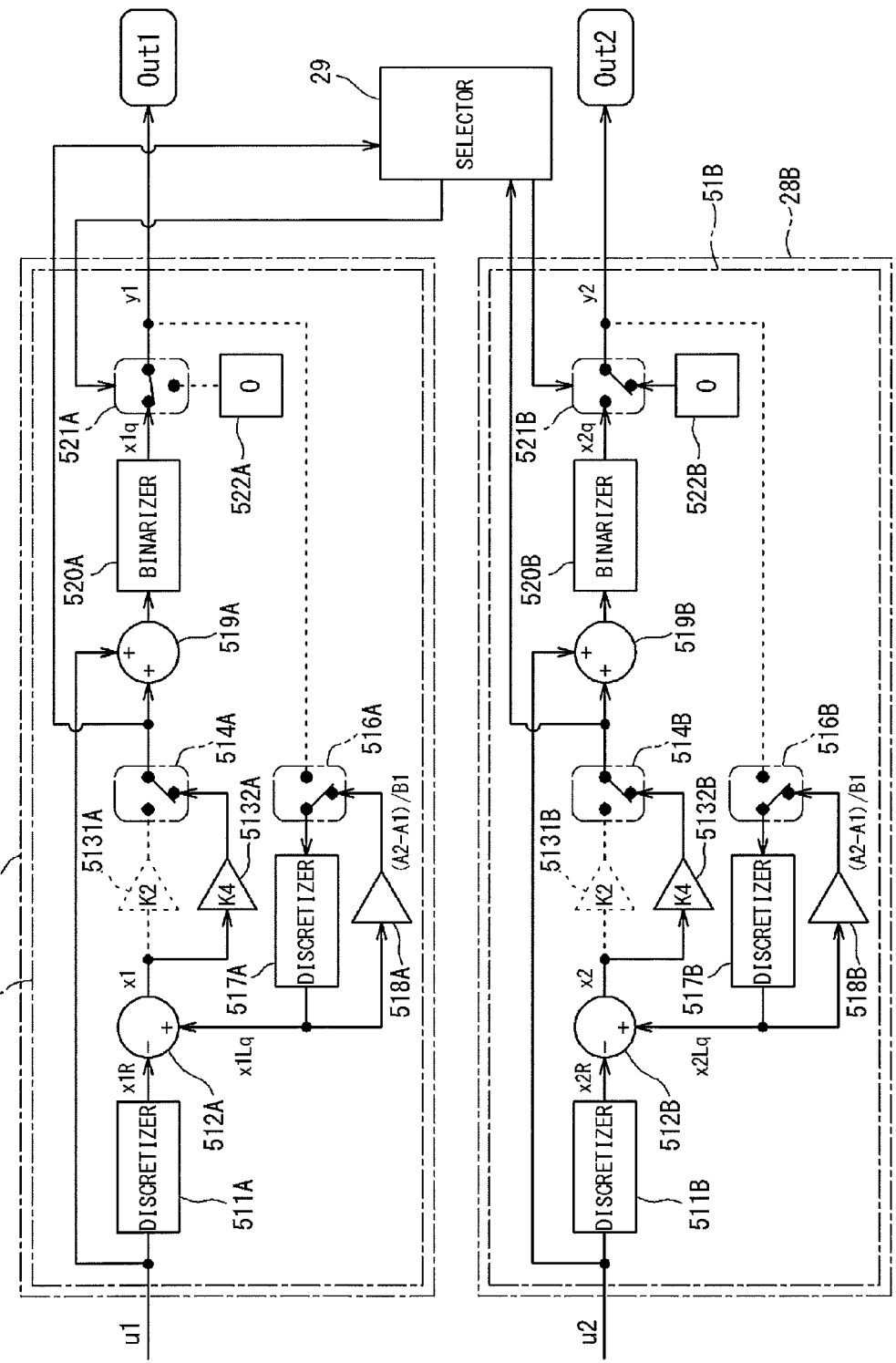
FIG. 9 is a diagram illustrating the operation of the control section according to Embodiment 1.

FIG. 9 is a block diagram illustrating the state of the control section 25 in the period INT1 shown in FIG. 8. In FIG. 9, u1, u2 indicate target voltages, and x1R, x2R indicate signals outputted from the discretizers 511A, 511B. In addition, x1Lq, x2Lq indicate signals outputted from the discretizers 517A, 517B, and x1, x2 indicate signals outputted from the differentiators 512A, 512B. Further, x1q, x2q indicate signals outputted from the binarizers 520A, 520B, and y1, y2 indicate signals outputted from the switches 521A, 521B. K2, K4 indicate amplification factors of the amplifiers 5131A (5131B), 5132A (5132B). In FIG. 9, the comparators 53A, 53B, the header/footer adders 55A, 55B, and the amplifiers 57A, 57B are not illustrated. In addition, the delay units 523A (523B), 524A (524B) in the quantizers 51A, 51B are also not illustrated.

In the period INT1, the selector 29 provides the voltage V1 to the comparators 53A, 53B in the packet generators 28A, 28B (FIG. 4), and further, the comparators 53A, 53B provide voltages (H level voltage or L level voltage) according to the voltage V1 to the Act1 terminal of the quantizer 51A and the Act2 terminal of the quantizer 51B. Thereby, in the switch 521A, the connection destination of the output terminal is set to the upper input terminal, while in the switch 521B, the connection destination of the output terminal is set to the lower input terminal. Thus, the packet generator 28A outputs the control signal, while the packet generator 28B suspends outputting of the control signal.

Since, before the period INT1, neither the packet generators 28A nor 28B have outputted the control signals, the drive terminals of the switches 514A, 514B and the switches 516A, 516B are maintained at the L level voltage. Therefore, in the switches 514A, 514B, the connection destination of the output terminal is set to the lower input terminal. Also in the switches 516A, 516B, the connection destination of the output terminal is set to the lower input terminal.

Incidentally, in the quantizer 51A (51B), it is assumed that the amplification factor of the amplifier 5131A (5131B) is K2, and the amplification factor of the amplifier 5132A (5132B) is K4. In this case, the following relationships are established:

$$K2=-(C1 \cdot B1)^{-1} \cdot C1 \cdot A1, K4=-(C1 \cdot B1)^{-1} \cdot C1 \cdot A2$$

where "·" indicates multiplication.

In the above equations, A1, B1, C1 used to define K2 are parameters which are derived when it is assumed that the power packet is supplied to the load 4A (4B) (the state of FIG. 7A). Further, A2 used to define K4 is a parameter which is derived when it is assumed that no power packet is supplied to the load 4A (4B) (the state of FIG. 7B).

Assuming that, in FIG. 7A, the capacitance of the capacitor for buffering is C, the magnitude of the connection resistor is R, and the magnitude of the load 4A (4B) is $R_L$, the parameters A1, B1, C1 are expressed by the following formula (1):

[Math 1]

$$A1 = -\frac{R+R_L}{CRR_L}$$

$$B1 = \frac{1}{CR}$$

$$C1 = 1$$

Formula (1)

Assuming that, in FIG. 7B, the capacitance of the capacitor for buffering is C, and the magnitude of the load 4A (4B) is $R_L$, the parameter A2 is expressed by the following formula (2):

[Math 2]

$$A2 = -\frac{1}{CR_L} \qquad \text{Formula (2)}$$

As described above, the amplifier 5131A (5131B) is set so as to have the amplification factor K2, and the amplifier 5132A (5132B) is set so as to have the amplification factor K4.

In the period INT1, the following relational formulae (3) and (4) are established among the signals u1, u2, x1R, x2R, x1Lq, x2Lq, x1, x2, x1q, x2q, y1, and y2. In the formulae (3) and (4), Q[ ] indicates a binarization function. In addition, k is a parameter that can take any of values from 0 to S−1 (S is a positive integer). The value of S is set at 100, for example. The value of the parameter k is incremented for every time interval K/S. The value of S is set at 100, for example. The same can be applied to the later-described formulae (5) to (12).

[Math 3]

$$x1(k) = x1Lq(k) - x1R(k) \qquad (3\text{-}1)$$

$$x1Lq(k+1) = A2 \cdot x1Lq(k) \qquad (3\text{-}2)$$

$$x1R(k+1) = A1 \cdot x1R(k) + B1 \cdot u1(k) \qquad (3\text{-}3)$$

$$x1q(k) = Q[K4 \cdot x1(k) + u1(k)] \qquad (3\text{-}4)$$

$$y1(k) = x1q(k) \qquad (3\text{-}5) \text{ Formula (3)}$$

[Math 4]

$$x2(k) = x2Lq(k) - x2R(k)$$

$$x2Lq(k+1) = A2 \cdot x2Lq(k)$$

$$x2R(k+1) = A1 \cdot x2R(k) + B1 \cdot u2(k)$$

$$x2q(k) = Q[K4 \cdot x2(k) + u2(k)]$$

$$y2(k) = 0 \qquad \text{Formula (4)}$$

Hereinafter, the respective components of the quantizer 51A will be described in relation to the above formulae.

The discretizer 511A executes the process expressed by the above equation (3-3). A signal x1R(k+1) outputted from the discretizer 511A represents a voltage of the load 4A in the state where the target voltage is applied to the load 4A, and the voltage includes a transient state from when electric power is started to be applied to the load 4A which has not been supplied with electric power, to when the electric power reaches the target voltage.

The discretizer 511A outputs the signal x1R(k+1) based on the target voltage u1(k), and x1R(k) (past value).

In FIG. 9, the amplifier 518A and the discretizer 517A execute the process expressed by the above equation (3-2). A signal x1Lq(k+1) processed by the amplifier 518A and the discretizer 517A represents a voltage estimated as being applied to the load 4A.

That is, the signal x1Lq(k+1) represents the voltage estimated as being applied to the load 4A due to the fact that the power packet is supplied to the load 4A.

The discretizer 517A executes the process expressed by the following equation (3-6). In the equation (3-6), "P" is set to "1" in the case where the quantizer 51A outputted the control signal in the period (INT unit) immediately preceding to the current period, and is set to "0" in the case where the quantizer 51A did not output the control signal in the period (INT unit) immediately preceding to the current period.

In other words, "P" being set to "1" indicates that the quantizer 51A was in the generation state in the period (INT unit) immediately preceding to the current period, and "P" being set to "0" indicates that the quantizer 51A was in the non-generation state in the period (INT unit) immediately preceding to the current period.

[Math 5]

$$x1Lq(k+1) = \{(A1-A2)P + A2\}x1Lq(k) + B1y1(k) \qquad (3\text{-}6)$$

The control signal outputted from the switch 521A is provided to the switch 516A via the delay unit 524A (FIG. 5). The delay unit 524A delays the control signal by one period of the INT unit (by one power packet) as described above, and provides the control signal to the switch 516A. Therefore, if the quantizer 51A outputted the control signal in the period (INT unit) immediately preceding to the current period, the switch 516A is switched to the upper input terminal. Otherwise, the switch 516A is switched to the lower input terminal.

That is, "P" in the equation (3-6) represents the state of the switch 516A.

In the case where the quantizer 51A was in the non-generation state in the period (INT unit) immediately preceding to the current period, the switch 516A is switched to the lower input terminal, and thereby connects the amplifier 518A to the discretizer 517A.

When the switch 516A is switched to the lower input terminal, the discretizer 517A sets "P" to "0". The control signal (y(k)) in the immediately previous period is "0".

The amplification factor of the amplifier 518A is set to (A2−A1)/B1 times.

Therefore, the discretizer 517A multiples the signal (x1Lq(k)) that has been outputted immediately before the current period by (A2−A1)/B1, to execute the process expressed by the above equation (3-6). Thus, the discretizer 517A and the amplifier 518A consequently execute the process expressed by the above equation (3-2) to output the signal x1Lq(k+1).

In the case where the quantizer 51A was in the generation state in the period (INT unit) immediately preceding to the current period, the switch 516A is switched to the upper input terminal, and thereby connects the rear stage of the switch 521A to the discretizer 517A.

The discretizer 517A sets "P" to "1" when the switch 516A is switched to the upper input terminal.

Therefore, the discretizer 517A executes the process expressed by the above equation (3-6). Thus, the discretizer 517A consequently executes the process expressed by the following equation (5-2) to output the signal x1Lq(k+1).

The case where the quantizer 51A was in the generation state in the period (INT unit) immediately preceding to the current period, means that the power packet was provided to the load 4A in the period (INT unit) immediately preceding to the current period.

The case where the quantizer 51A was in the non-generation state in the period (INT unit) immediately preceding to the current period, means that no power packet was supplied to the load 4A in the period (INT unit) immediately preceding to the current period.

As described above, the discretizer 517A of the present embodiment determines whether or not the power packet is supplied to the load 4A, depending on the presence/absence of the control signal outputted from the switch 521A, and switches the process for obtaining the signal x1Lq(k+1) in accordance with the result of the determination.

That is, the discretizer 517A determines the supply state of the power packet in the load 4A, and outputs the signal x1Lq(k+1) in each of the state where the power packet is supplied (first state) and the state where no power packet is supplied (second state) in accordance with the result of the determination.

FIG. 9 shows the case where the quantizer 51A was in the non-generation state in the period (INT unit) immediately preceding to the current period, and the quantizer 51A determines that the load 4A was in the state where no power packet was supplied thereto in the period (INT unit) immediately preceding to the current period.

Based on the determination, the quantizer 51A executes the process expressed by the above equation (3-2) to output the signal x1Lq(k+1). That is, the equation (3-2) is an equation for calculating a voltage estimated as being applied to the load 4A when a state where no power packet is supplied to the load 4A (FIG. 7B) is assumed.

The signal x1 (x2) outputted from the differentiator 512A (512B) is amplified by the amplifier 5132A (5132B) and inputted to the adder 519A (519B). The signal x1Lq (x2Lq) outputted from the discretizer 517A (517B) is inputted to the amplifier 518A (518B). Thereby, the signal x1Lq is amplified by (A2−A1)/B1 times for every increment of the parameter k by 1, and inputted to the differentiator 512A (512B).

The above equation (3-1) represents the process executed by the differentiator 512A. That is, the differentiator 512A calculates a difference between the signal x1Lq(k) and the signal x1R(k), and outputs a signal x1(k). That is, the signal x1(k) is a difference between the signal x1Lq(k) and the signal x1R(k).

As described above, the signal x1R(k) represents the voltage of the load 4A in the state where the target voltage is applied to the load 4A.

The signal x1Lq(k) represents the voltage estimated as being applied to the load 4A due to the fact that the power packet is supplied thereto, as described above.

That is, the signal x1R(k) represents a voltage value in the ideal state when the target voltage is applied to the load 4A, and the signal x1Lq(k) represents (an estimated value) of an actual voltage value in the load 4A, which may vary due to the fact that the power packet is intermittently supplied to the load 4A.

Therefore, the signal x1(k) which is a difference between the signal x1Lq(k) and the signal x1R(k) represents a difference between the actual voltage value in the load 4A and the voltage value in the ideal state of the load 4A.

As described above, the signal x1R(k) can be regarded as a target voltage in the load 4A.

The "target voltage" in the present specification includes the above-described target voltage u1(k) and the signal x1R(k).

The signal x1(k) can be regarded as a differential voltage between the signal x1Lq(k) as the voltage estimated as being applied to the load 4A, and the signal x1R(k) as the target voltage.

The signal x1(k) is provided to the amplifier 5131A or the amplifier 5132A.

The signal x1(k) is multiplied by the above-described amplification factor K2 or K4 by the amplifier 5131A or the amplifier 5132A, and then provided to the switch 514A.

The switch 514A provides the signal x1(k) multiplied by K2 or K4, as the differential voltage ΔV1, to the adder 519A and the selector 29.

In FIG. 9, the switch 514A is switched to the lower input terminal. Therefore, the switch 514A provides the signal x1(k) multiplied by K4, as the differential voltage ΔV1, to the adder 519A and the selector 29.

The differential voltage ΔV1 is a voltage (signal) obtained by converting the signal x1(k) representing the difference between the actual voltage value in the load 4A and the voltage value in the ideal state, to a signal for control on the quantizer 51A side.

That is, the differential voltage ΔV1 represents the degree of the difference between the actual voltage value in the load 4A and the voltage value in the ideal state. Therefore, the greater the differential voltage ΔV1 is, the more the actual voltage value in the load 4A diverges from the voltage value in the ideal state. On the other hand, the smaller the differential voltage ΔV1 is, the more the actual voltage value in the load 4A conforms to the voltage value in the ideal state.

As described above, the selector 29 controls the quantizers 51A, 51B so that the control signal is outputted from only the quantizer 51A (51B) having the greater differential voltage ΔV1 (ΔV2), between the quantizers 51A and 51B.

Therefore, the selector 29 can perform control so that the control signal is outputted from only the quantizer 51A (51B) corresponding to the load 4A (4B) which is determined to have the actual voltage value more diverging from the voltage value in the ideal state thereof.

As the result, the control section 25 can perform control so that the voltages respectively applied to the two loads 4A and 4B can be changed at voltages as close as possible to the target voltages.

The adder 519A provides, to the binarizer 520A, a value (voltage) obtained by adding the target voltage u(k) to the differential voltage ΔV1.

The binarizer 520A shown in FIG. 9 executes the process expressed by the above equation (3-4) to output the signal x1q(k).

When the value (voltage) obtained by adding the target voltage u(k) to the differential voltage ΔV1 is less than a predetermined threshold, the binarizer 520A outputs the L level voltage as the signal x1q(k).

On the other hand, when the value (voltage) obtained by adding the target voltage u(k) to the differential voltage ΔV1 is equal to or greater than the predetermined threshold, the binarizer 520A outputs, as the signal x1q(k), a signal set to a predetermined voltage value.

The predetermined threshold is set to the target voltage or to a voltage value slightly greater than the target voltage, for example. The predetermined voltage value is set to a voltage value equal to or greater than the target voltage, for example.

Further, in FIG. 9, since the switch 521A is switched to the upper input terminal, the quantizer 51A outputs the signal x1q(k) as a signal y1(k) as expressed by the above equation (3-5). The signal y1(k) is outputted as a control signal and provided to the header/footer adder 55A (FIG. 4) in the subsequent stage.

As described above, the packet generator 28A (quantizer 51A) shown in FIG. 9 outputs the control signal.

The respective components of the packet generator 28B (quantizer 51B) perform the same processes as performed in the packet generator 28A (quantizer 51A).

In FIG. 9, the packet generator 28B (quantizer 51B) suspends outputting of the control signal because, in the switch 521B, the connection destination of the output terminal is set to the lower input terminal.

In the packet generator 28B, the settings of the switch 514B and the switch 516B are identical to those in the packet generator 28A, except for the above points.

Next, the operation in the period INT2 shown in FIG. 8 will be described. The period INT2 is, like the period INT1, started when the selector 29 has determined that the output value (differential voltage ΔV1) of the switch 514A is equal to or greater than the output value (differential voltage ΔV2) of the switch 514B. That is, the period INT2 is started when it has been determined that the differential voltage ΔV1 between the target voltage and the voltage estimated as being applied to the load 4A is equal to or greater than the differential voltage ΔV2 between the target voltage and the voltage estimated as being applied to the load 4B.

The period INT2 corresponds to a period that follows its immediately preceding one-packet-time period in which the packet generator 28A outputted the control signal and the packet generator 28B did not output the control signal. That is, the period INT2 corresponds to a period that follows its immediately preceding one-packet-time period in which the power packet was supplied to the load 4A and no power packet was supplied to the load 4B.

Figure 10:
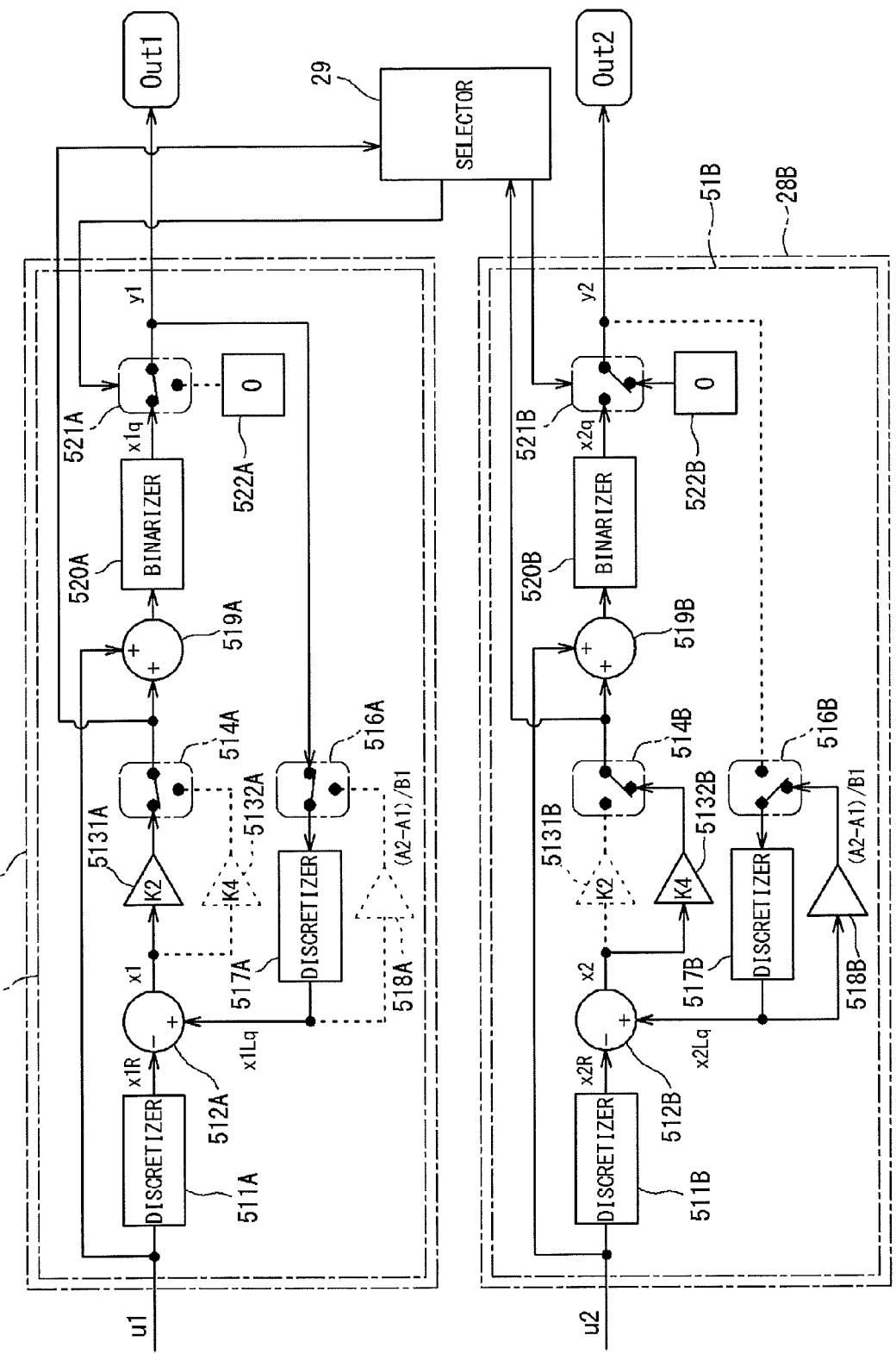
FIG. 10 is a diagram illustrating the operation of the control section according to Embodiment 1.

FIG. 10 is a block diagram illustrating the state of the control section 25 in the period INT2 shown in FIG. 8. In FIG. 10, the comparators 53A, 53B, the header/footer adders 55A, 55B, and the amplifiers 57A, 57B are not illustrated. In addition, the delay units 523A (523B), 524A (524B) in the quantizers 51A, 51B are also not illustrated.

In the period INT2, the selector 29 provides the voltage V1 to the comparators 53A, 53B in the packet generators 28A, 28B (FIG. 4), and further, the comparators 53A, 53B provide voltages (H level voltage or L level voltage) according to the voltage V1 to the Act1 terminal of the quantizer 51A and the Act2 terminal of the quantizer 51B. Thereby, in the switch 521A, the connection destination of the output terminal is set to the upper input terminal, while in the switch 521B, the connection destination of the output terminal is set to the lower input terminal. Thus, the packet generator 28A outputs the control signal, and the packet generator 28B suspends outputting of the control signal.

Since, in the period INT1, the packet generator 28A outputs the control signal and the packet generator 28B does not output the control signal, the drive terminals of the switch 514A and the switch 516A are set at the H level voltage. The drive terminals of the switch 514B and the switch 516B are maintained at the L level voltage. Therefore, in both the switches 514A and 516A, the connection destination of the output terminal is set to the upper input terminal. On the other hand, in the switches 514B, 516B, the connection destination of the output terminal is set to the lower input terminal.

In the period INT2, the following relational formulae (5) and (6) are established among the signals u1, u2, x1R, x2R, x1Lq, x2Lq, x1, x2, x1q, x2q, y1, and y2.

[Math 6]

$$x1(k) = x1Lq(k) - x1R(k) \quad (5\text{-}1)$$

$$x1Lq(k+1) = A1 \cdot x1Lq(k) + B1 \cdot y1(k) \quad (5\text{-}2)$$

$$x1R(k+1) = A1 \cdot x1R(k) + B1 \cdot u1(k) \quad (5\text{-}3)$$

$$x1q(k) = Q[K2 \cdot x1(k) + u1(k)] \quad (5\text{-}4)$$

$$y1(k) = x1q(k) \quad (5\text{-}5) \text{ Formula (5)}$$

[Math 7]

$$x2(k) = x2Lq(k) - x2R(k)$$

$$x2Lq(k+1) = A2 \cdot x2Lq(k)$$

$$x2R(k+1) = A1 \cdot x2R(k) + B1 \cdot u2(k)$$

$$x2q(k) = Q[K4 \cdot x2(k) + u2(k)]$$

$$y2(k) = 0 \quad \text{Formula (6)}$$

The signal x1 outputted from the differentiator 512A is amplified by the amplifier 5131A, and inputted to the adder 519A. On the other hand, the signal x2 outputted from the differentiator 512B is amplified by the amplifier 5132B and inputted to the adder 519B.

The discretizer 517A inputs, to the differentiator 512A, the signal x1Lq obtained by discretizing the signal y1 outputted from the switch 521A. On the other hand, the signal x2Lq outputted from the discretizer 517B is inputted to the amplifier 518B. Thereby, the signal x2Lq is amplified by (A2−A1)/B1 times for every increment of the parameter k by 1, and inputted to the differentiator 512B.

The packet generator 28A in the period INT2 is different from the packet generator 28A in the period INT1 in the following points. That is, in the packet generator 28A in the period INT2, the switch 514A and the switch 516A are switched from the lower input terminal to the upper input terminal.

Since the switch 516A is switched to the upper input terminal, the rear stage of the switch 521A is connected to the discretizer 517A.

Therefore, the discretizer 517A executes the process expressed by the above equation (3-6), and consequently executes the process expressed by the above equation (5-2) to output the signal x1Lq(k+1).

The equation (5-2) is an equation for calculating a voltage estimated as being applied to the load 4A in the case where the state in which the power packet is supplied to the load 4A (FIG. 7A) is assumed.

When the switch 514A is switched to the upper input terminal, the signal x1(k) is provided to the amplifier 5131A and is multiplied by K2. The subsequent process is identical to that for the quantizer 51A shown in FIG. 8. Therefore, the binarizer 520A shown in FIG. 10 outputs the signal x1q(k) by executing the process expressed by the above equation (5-4).

As described above, the switch 514A performs switching at the same timing as the switch 516A, and thereby switches the target to which the signal x1(k) is provided, between the amplifier 5131A and the amplifier 5132A, in accordance with the process executed by the discretizer 517A.

Thereby, the quantizer 51A can perform switching between the equations (3-2), (3-4) and the equations (5-2), (5-4) in the period INT1.

In the formula 5 executed by the packet generator 28A in the period INT2, the equations (5-1), (5-3), and (5-5) other than the equations (5-2) and (5-4) are identical to the above equations (3-1), (3-3), and (3-5), respectively.

In the packet generator 28B in the period INT2, the settings of the switches 514B, 516B, 521B are identical to those in the packet generator 28B in the period INT1. Therefore, the equations included in the formula (6) are identical to the equations included in the formula (4).

Next, the operation in the period INT3 shown in FIG. 8 will be described. The period INT3 is started when the selector 29 has determined that the output value (differential voltage ΔV1) of the switch 514A is smaller than the output value (differential voltage ΔV2) of the switch 514B. That is, the period INT3 is started when it has been determined that the differential voltage ΔV1 between the target voltage and the voltage estimated as being applied to the load 4A is smaller than the differential voltage ΔV2 between the target voltage and the voltage estimated as being applied to the load 4B.

In addition, the period INT3 corresponds to a period that follows its immediately preceding one-packet-time period in which the packet generator 28A outputted the control signal and the packet generator 28B did not output the control signal. That is, the period INT3 corresponds to a period that follows its immediately preceding one-packet-time period in which the power packet was supplied to the load 4A and no power packet was supplied to the load 4B.

Figure 11:
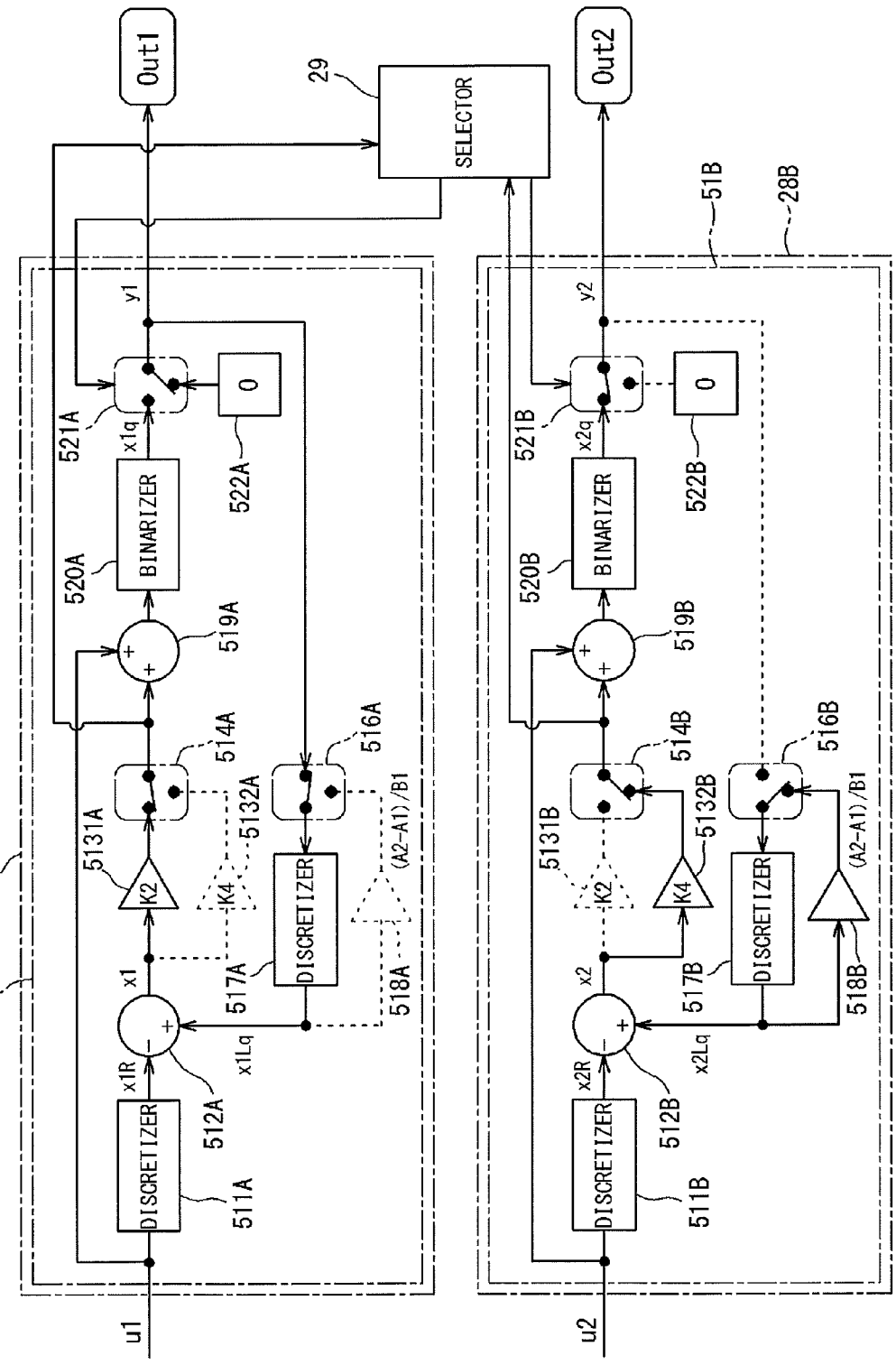
FIG. 11 is a diagram illustrating the operation of the control section according to Embodiment 1.

FIG. 11 is a block diagram illustrating the state of the control section 25 in the period INT3 shown in FIG. 8. In FIG. 11, the comparators 53A, 53B, the header/footer adders 55A, 55B, and the amplifiers 57A, 57B are not illustrated. In addition, the delay units 523A (523B), 524A (524B) in the quantizers 51A, 51B are also not illustrated.

In the period INT3, the selector 29 provides the voltage 2*V1 to the comparators 53A, 53B in the packet generators 28A, 28B (FIG. 4), and further, the comparators 53A, 53B provide voltages (L level voltage or H level voltage) according to the voltage 2*V1 to the Act1 terminal of the quantizer 51A and the Act2 terminal of the quantizer 51B. Thereby, in the switch 521A, the connection destination of the output terminal is set to the lower input terminal, while in the switch 521B, the connection destination of the output terminal is set to the upper input terminal. Thus, the packet generator 28A suspends outputting of the control signal, and the packet generator 28B outputs the control signal.

Since, in the period INT2, the packet generator 28A outputs the control signal and the packet generator 28B does not output the control signal, the drive terminals of the switch 514A and the switch 516A are set at the H level voltage. The drive terminals of the switch 514B and the switch 516B are maintained at the L level voltage. Therefore, in both the switches 514A and 516A, the connection destination of the output terminal is set to the upper input terminal. On the other hand, in the switches 514B, 516B, the connection destination of the output terminal is set to the lower input terminal. This state is maintained during the period INT3 by the functions of the delay units 523A (523B), 524A (524B).

In the period INT3, the following relational formulae (7) and (8) are established among the signals u1, u2, x1R, x2R, x1Lq, x2Lq, x1, x2, x1$q$, x2$q$, y1, and y2.

[Math 8]

$$x1(k)=x1Lq(k)-x1R(k) \quad (7\text{-}1)$$

$$x1Lq(k+1)=A1 \cdot x1Lq(k)+B1 \cdot y1(k) \quad (7\text{-}2)$$

$$x1R(k+1)=A1 \cdot x1R(k)+B1 \cdot u1(k) \quad (7\text{-}3)$$

$$x1q(k)=Q[K2 \cdot x1(k)+u1(k)] \quad (7\text{-}4)$$

$$y1(k)=0 \quad (7\text{-}5) \text{ Formula (7)}$$

[Math 9]

$$x2(k)=x2Lq(k)-x2R(k)$$

$$x2Lq(k+1)=A2 \cdot x2Lq(k)$$

$$x2R(k+1)=A1 \cdot x2R(k)+B1 \cdot u2(k)$$

$$x2q(k)=Q[K4 \cdot x2(k)+u2(k)]$$

$$y2(k)=x2q(k) \quad \text{Formula (8)}$$

The signal x1 outputted from the differentiator 512A is amplified by the amplifier 5131A and inputted to the adder 519A. On the other hand, the signal x2 outputted from the differentiator 512B is amplified by the amplifier 5132B and inputted to the adder 519B.

The signal inputted to the discretizer 517A becomes zero, whereby the signal x1Lq inputted from the discretizer 517A to the differentiator 512A is gradually attenuated. On the other hand, the signal x2Lq outputted from the discretizer 517B is inputted to the amplifier 518B. Thereby, the signal x2Lq is amplified by (A2−A1)/B1 times for every increment of the parameter k by 1, and inputted to the differentiator 512B.

The packet generator 28A in the period INT3 is different from the packet generator 28A in the period INT2 in the following points. That is, in the packet generator 28A in the period INT3, outputting of the control signal is suspended because the switch 521A is switched from the upper input terminal to the lower input terminal.

Accordingly, the signal y1(k) becomes "0" as shown in the above equation (7-5).

In the formula 7 executed by the packet generator 28A in the period INT3, the equations other than the equation (7-5) are identical to those included in the formula (5).

Further, in the packet generator 28B in the period INT3, the settings of the switches 514B, 516B, 521B are identical to those in the packet generator 28A in the period INT1. Therefore, the equations included in the formula (8) executed by the packet generator 28B in the period INT3 are identical to the equations included in the formula (3).

Next, the operation in the period INT4 shown in FIG. 8 will be described. The period INT4 is, like the period INT3, started when the selector 29 has determined that the output value (differential voltage ΔV1) of the switch 514A is smaller than the output value (differential voltage ΔV2) of the switch 514B. That is, the period INT4 is started when it has been determined that the differential voltage ΔV1 between the target voltage and the voltage estimated as being applied to the load 4A is smaller than the differential voltage ΔV2 between the target voltage and the voltage estimated as being applied to the load 4B.

In addition, the period INT4 corresponds to a period that follows its immediately preceding one-packet-time period in which the packet generator 28A did not output the control signal and the packet generator 28B outputted the control signal. That is, the period INT4 corresponds to a period that follows its immediately preceding one-packet-time period in which no power packet was supplied to the load 4A and the power packet was supplied to the load 4B.

Figure 12:
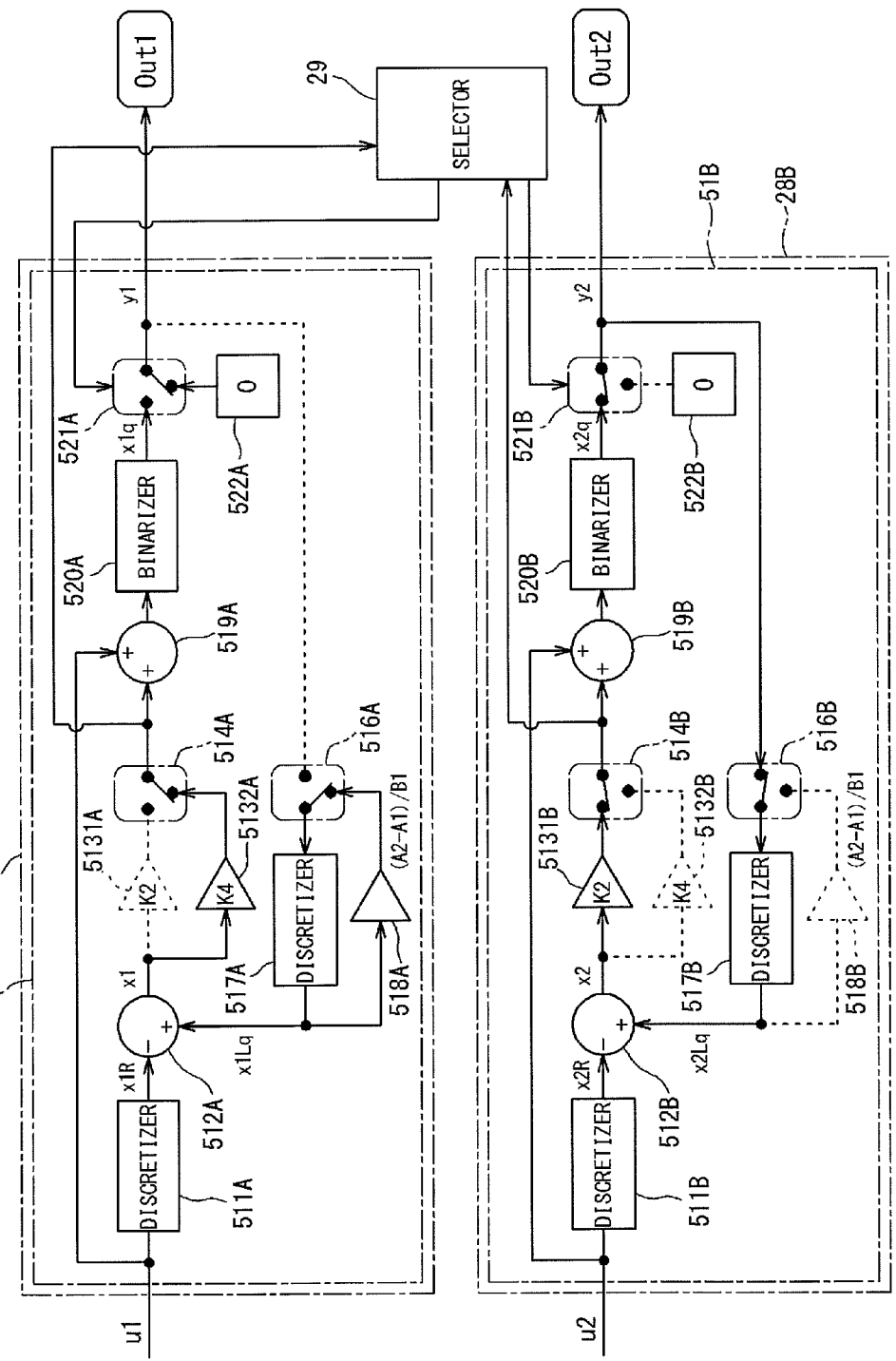
FIG. 12 is a diagram illustrating the operation of the control section according to Embodiment 1.

FIG. 12 is a block diagram illustrating the state of the control section 25 in the period INT4 shown in FIG. 8. In FIG. 12, the comparators 53A, 53B, the header/footer adders 55A, 55B, and the amplifiers 57A, 57B are not illustrated. In addition, the delay units 523A (523B), 524A (524B) in the quantizers 51A, 51B are also not illustrated.

In the period INT4, the selector 29 provides the voltage 2*V1 to the comparators 53A, 53B in the packet generators 28A, 28B (FIG. 4), and further, the comparators 53A, 53B provide voltages (L level voltage or H level voltage) according to the voltage 2*V1 to the Act1 terminal of the quantizer 51A and the Act2 terminal of the quantizer 51B. Thereby, in the switch 521A, the connection destination of the output terminal is set to the lower input terminal, while in the switch 521B, the connection destination of the output terminal is set to the upper input terminal. Thus, the packet generator 28A suspends outputting of the control signal, and the packet generator 28B outputs the control signal.

Since, in the period INT3, the packet generator 28A outputs no control signal and the packet generator 28B outputs the control signal, the drive terminals of the switch 514A and the switch 516A are set at the L level voltage. On the other hand, the drive terminals of the switch 514B and the switch 516B are maintained at the H level voltage. Therefore, in both the switches 514A and 516A, the connection destination of the output terminal is set to the lower input terminal. On the other hand, in the switches 514B, 516B, the connection destination of the output terminal is set to the upper input terminal. This state is maintained during the period INT4 by the delay units 523A (523B), 524A (524B).

In the period INT4, the following relational formulae (9) and (10) are established among the signals u1, u2, x1R, x2R, x1Lq, x2Lq, x1, x2, x1$q$, x2$q$, y1, and y2.

[Math 10]

$$x1(k)=x1Lq(k)-x1R(k) \quad (9\text{-}1)$$

$$x1Lq(k+1)=A2 \cdot x1Lq(k) \quad (9\text{-}2)$$

$$x1R(k+1)=A1 \cdot x1R(k)+B1 \cdot u1(k) \quad (9\text{-}3)$$

$$x1q(k)=Q[K4 \cdot x1(k)+u1(k)] \quad (9\text{-}4)$$

$$y1(k)=0 \quad (9\text{-}5) \text{ Formula (9)}$$

[Math 11]

$$x2(k)=x2Lq(k)-x2R(k)$$

$$x2Lq(k+1)=A1 \cdot x2Lq(k)+B1 \cdot y2(k)$$

$$x2R(k+1)=A1 \cdot x2R(k)+B1 \cdot u2(k)$$

$$x2q(k)=Q[K2 \cdot x2(k)+u2(k)]$$

$$y2(k)=x2q(k) \quad \text{Formula (10)}$$

The signal x1 outputted from the differentiator 512A is amplified by the amplifier 5132A and inputted to the adder 519A. On the other hand, the signal x2 outputted from the differentiator 512B is amplified by the amplifier 5131B and inputted to the adder 519B.

The signal x1Lq outputted from the discretizer 517A is inputted to the amplifier 518A. Thereby, the signal x1Lq is amplified by $(A2-A1)/B1$ times for every increment of the parameter k by 1, and inputted to the differentiator 512A. On the other hand, the discretizer 517B inputs, to the differentiator 512B, the resultant signal x2Lq obtained by discretizing the signal y2 outputted from the switch 521B.

The packet generator 28A in the period INT4 is different from the packet generator 28A in the period INT3 in the following points. That is, in the packet generator 28A in the period INT4, the switch 514A and the switch 516A are switched from the upper input terminal to the lower input terminal.

Since the switch 516A is switched to the lower input terminal, the amplifier 518A is connected to the discretizer 517A.

Therefore, the discretizer 517A executes the process expressed by the above equation (3-6), and consequently executes the process expressed by the above equation (9-2) to output the signal x1Lq(k+1).

The equation (9-2) is identical to the above equation (3-2), and it is an equation for calculating a voltage estimated as being applied to the load 4A when a state where no power packet is applied to the load 4A (FIG. 7B) is assumed.

When the switch 514A is switched to the lower input terminal, the signal x1(k) is provided to the amplifier 5132A, and is multiplied by K4. The subsequent process is identical to that of the quantizer 51A shown in FIG. 8. Therefore, the binarizer 520A shown in FIG. 10 executes the process expressed by the above equation (9-4) to output the signal x1$q$(k).

The equation (9-4) is identical to the equation (3-4).

In the formula (9) executed by the packet generator 28A in the period INT4, the equations (9-1), (9-3), and (9-5) other than the equations (9-2) and (9-4) are identical to the above equations (7-1), (7-3), and (7-5).

Further, in the packet generator 28B in the period INT4, the settings of the switches 514B, 516B, 521B are identical to those in the packet generator 28A in the period INT2. Therefore, the equations included in the formula (10) are identical to the equations included in the formula (5).

Next, the operation in the period INT5 shown in FIG. 8 will be described. The period INT5 is started when the selector 29 has determined that the output value (differential voltage ΔV1) of the switch 514A is equal to or greater than the output value (differential voltage ΔV2) of the switch 514B. That is, the period INT5 is started when it has been determined that the differential voltage ΔV1 between the target voltage and the voltage estimated as being applied to the load 4A is equal to or greater than the differential voltage ΔV2 between the target voltage and the voltage estimated as being applied to the load 4B.

The period INT5 corresponds to a period that follows its immediately preceding one-packet-time period in which the packet generator 28A did not output the control signal and the packet generator 28B outputted the control signal. That is, the period INT5 corresponds to a period that follows its immediately preceding one-packet-time period in which no power packet was supplied to the load 4A and the power packet was supplied to the load 4B.

Figure 13:
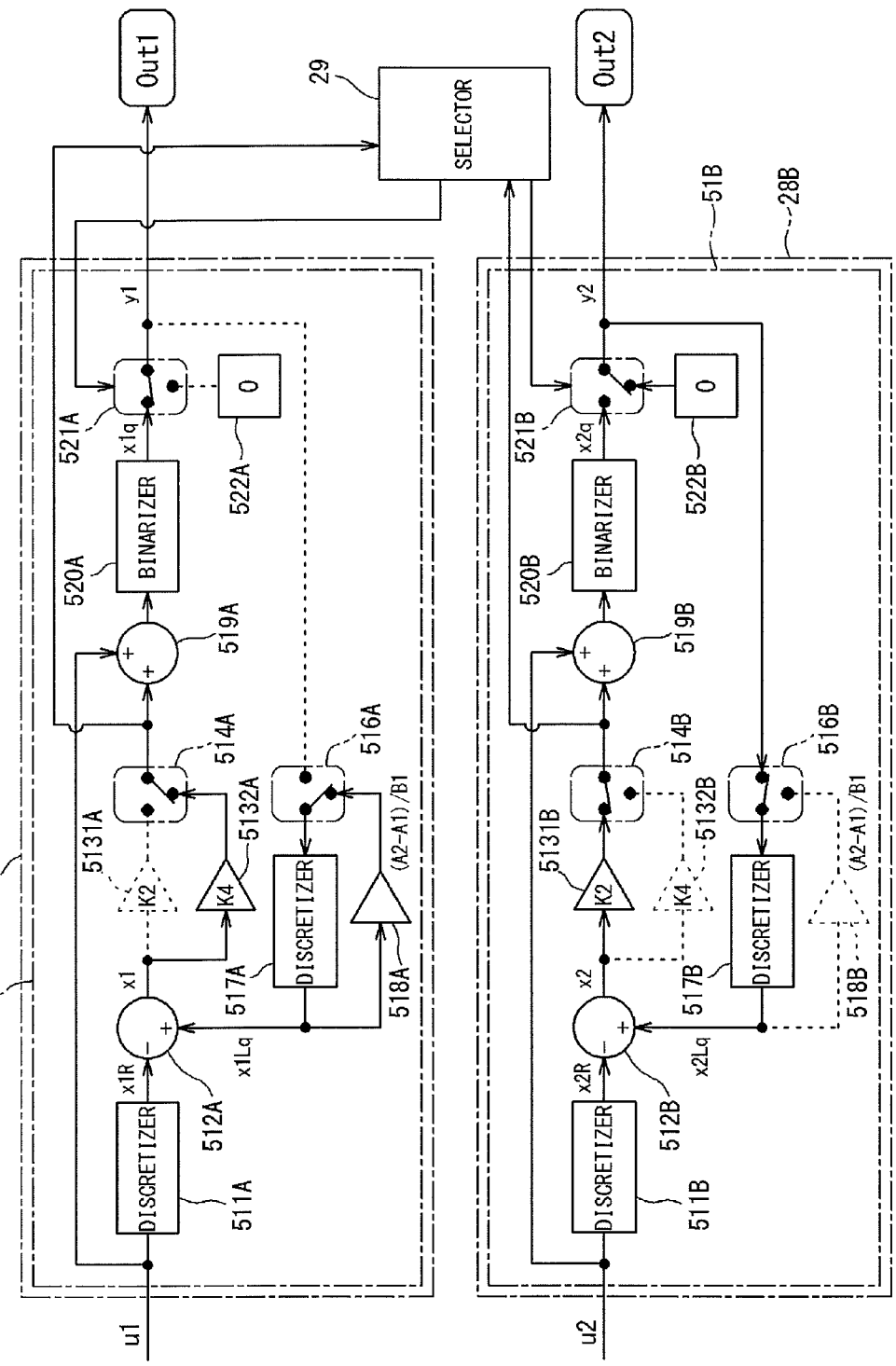
FIG. 13 is a diagram illustrating the operation of the control section according to Embodiment 1.

FIG. 13 is a block diagram illustrating the state of the control section 25 in the period INT5 shown in FIG. 8. In FIG. 13, the comparators 53A, 53B, the header/footer adders 55A, 55B, and the amplifiers 57A, 57B are not illustrated. In addition, the delay units 523A (523B), 524A (524B) included in the quantizers 51A, 51B are also not illustrated.

In the period INT5, the selector 29 provides the voltage V1 to the comparators 53A, 53B in the packet generators 28A, 28B (FIG. 4), and further, the comparators 53A, 53B provide voltages (H level voltage or L level voltage) according to the voltage V1 to the Act1 terminal of the quantizer 51A and the Act2 terminal of the quantizer 51B. Thereby, in the switch 521A, the connection destination of the output terminal is set to the upper input terminal, while in the switch 521B, the connection destination of the output terminal is set to the lower input terminal. Thus, the packet generator 28A outputs the control signal, and the packet generator 28B suspends outputting of the control signal.

Since, in the period INT4, the packet generator 28A outputs no control signal and the packet generator 28B outputs the control signal, the drive terminals of the switch 514A and the switch 516A are set at the L level voltage. On the other hand, the drive terminals of the switch 514B and the switch 516B are maintained at the H level voltage. Therefore, in both the switches 514A and 516A, the connection destination of the output terminal is set to the lower input terminal. On the other hand, in the switches 514B, 516B, the connection destination of the output terminal is set to the upper input terminal. This state is maintained during the period INT5 by the functions of the delay units 523A (523B), 524A (524B).

In the period INT5, the following relational formulae (11) and (12) are established among the signals u1, u2, x1R, x2R, x1Lq, x2Lq, x1, x2, x1q, x2q, y1, and y2.

[Math 12]

$$x1(k)=x1Lq(k)-x1R(k) \quad (11\text{-}1)$$

$$x1Lq(k+1)=A2 \cdot x1Lq(k) \quad (11\text{-}2)$$

$$x1R(k+1)=A1 \cdot x1R(k)+B1 \cdot u1(k) \quad (11\text{-}3)$$

$$x1q(k)=Q[K4 \cdot x1(k)+u1(k)] \quad (11\text{-}4)$$

$$y1(k)=x1q(k) \quad (11\text{-}5) \text{ Formula (11)}$$

[Math 13]

$$x2(k)=x2Lq(k)-x2R(k)$$

$$x2Lq(k+1)=A1 \cdot x2Lq(k)+B1 \cdot y2(k)$$

$$x2R(k+1)=A1 \cdot x2R(k)+B1 \cdot u2(k)$$

$$x2q(k)=Q[K2 \cdot x2(k)+u2(k)]$$

$$y2(k)=0 \quad \text{Formula (12)}$$

The signal x1 outputted from the differentiator 512A is amplified by the amplifier 5132A and inputted to the adder 519A. On the other hand, the signal x2 outputted from the differentiator 512B is amplified by the amplifier 5131B and inputted to the adder 519B.

Further, the signal x1Lq outputted from the discretizer 517A is inputted to the amplifier 518A. Thereby, the signal x1Lq is amplified by (A2−A1)/B1 times for every increment of the parameter k by 1, and inputted to the differentiator 512A. On the other hand, the signal inputted to the discretizer 517B becomes zero, whereby the signal x2Lq inputted from the discretizer 517B to the differentiator 512B is gradually attenuated.

The packet generator 28A in the period INT5 is different from the packet generator 28A in the period INT4 in the following points. That is, the packet generator 28A in the period INT5 outputs the control signal because the switch 521A is switched from the lower input terminal to the upper input terminal.

Therefore, in the packet generator 28A in the period INT5, the settings of the switches 514B, 516B, 521B are identical to those in the packet generator 28A in the period INT1. Therefore, the respective equations included in the above equation (11) executed by the packet generator 28A in the period INT5 are identical to the equations included in the above formula (3).

Further, in the packet generator 28B in the period INT5, the settings of the switches 514B, 516B, 521B are identical to those in the packet generator 28A in the period INT3. Therefore, the respective equations included in the above formula (12) executed by the packet generator 28B in the period INT5 are identical to the equations included in the above formula (7).

Next, the operation in the period INT6 shown in FIG. 8 will be described. The period INT6 is started when the selector 29 has determined that the output value (differential voltage ΔV1) of the switch 514A is smaller than the output value (differential voltage ΔV2) of the switch 514B. That is, the period INT6 is started when it has been determined that the differential voltage ΔV1 between the target voltage and the voltage estimated as being applied to the load 4A is smaller than the differential voltage ΔV2 between the target voltage and the voltage estimated as being applied to the load 4B.

The period INT6 corresponds to a period that follows its immediately preceding one-packet-time period in which the packet generator 28A outputted the control signal and the packet generator 28B did not output the control signal. That is, the period INT6 corresponds to a period that follows its immediately preceding one-packet-time period in which the power packet was supplied to the load 4A and no power packet was supplied to the load 4B.

In the period INT6, the packet generators 28A, 28B are in the same state as shown in FIG. 11. That is, the control section 25 performs the same operation as that in the period INT3.

As described above, in the control section 25 according to the present embodiment, the selector 29 sets each of the packet generators 28A, 28B in the generation state or the non-generation state, taking into consideration the behaviors of the voltages which are estimated as being applied to the loads 4A, 4B in the period one-packet-time K before the current period. Specifically, the selector 29 sets the packet generator 28A in the generation state and the packet generator 28B in the non-generation state, or sets the packet generator 28A in the non-generation state and the packet generator 28B in the generation state.

Further, as shown by the formulae (3) to (12), the quantizer 51A (51B) generates a control signal at a certain time (k+1), based on the target voltage obtained in the past.

<3> Conclusion

Eventually, according to the mixer 2 of the present embodiment, the selector 29 performs switching between the state where the packet generators 28A, 28B cause the switches 21A, 21B to perform ON/OFF operation and the state where the packet generators 28A, 28B maintain the switches 21A, 21B in their OFF states. Thus, while the packet generators 28A, 28B cause one of the two switches 21A, 21B to perform ON/OFF operation, the other switch can be maintained in its OFF state. Therefore, even in the configuration in which a plurality of power packets are transmitted to one main transmission line L1, the power packets are prevented from colliding with each other, thereby preventing the waveforms of the power packets from being deformed.

Thus, while using the two power sources 1A, 1B, it is possible to avoid the drawback that power packets are not transmitted to desired loads.

Embodiment 2

Figure 14:
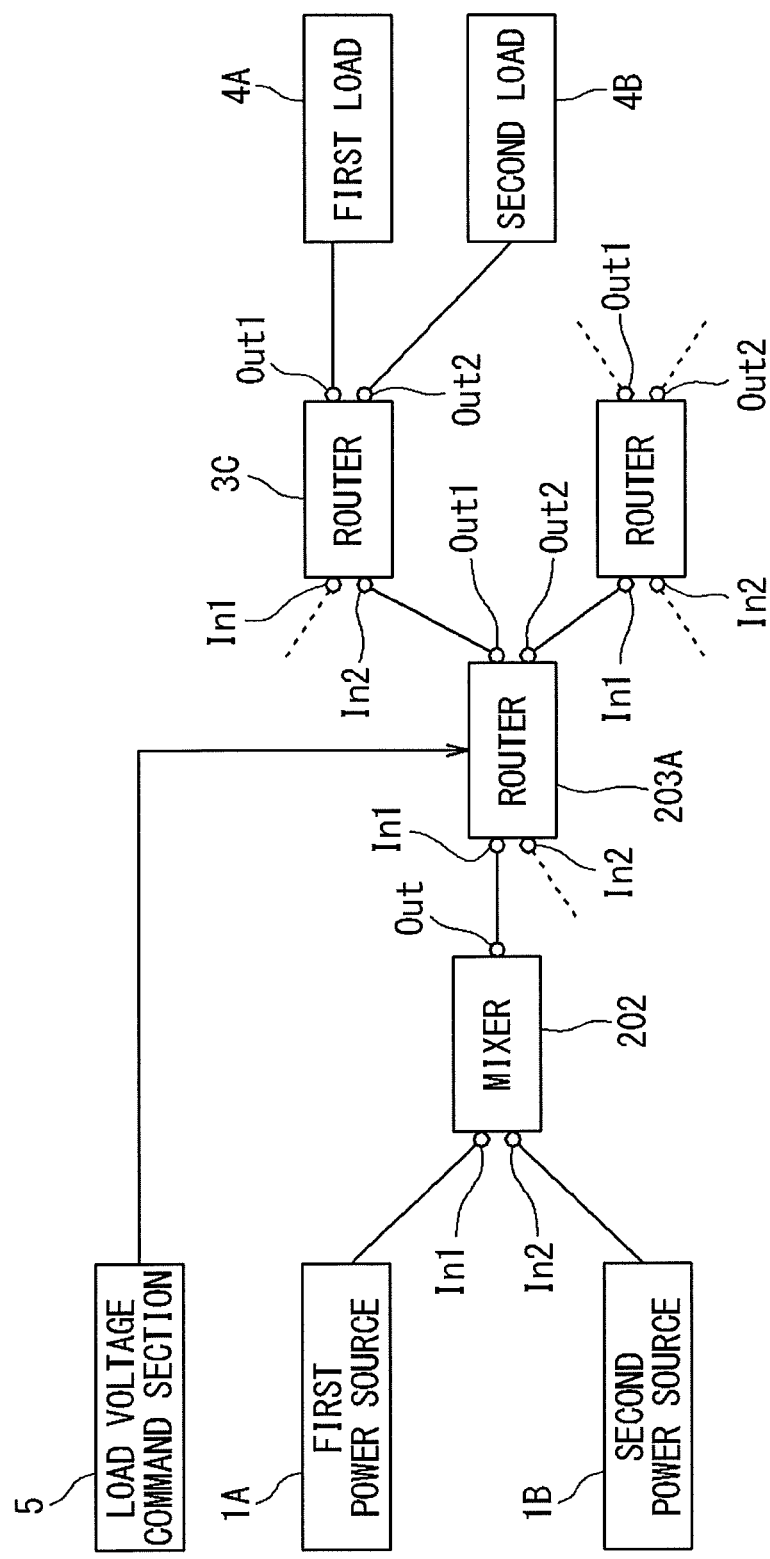
FIG. 14 is a configuration diagram of a power network according to Embodiment 2.

FIG. 14 shows a configuration diagram of a power network according to the present embodiment.

The power network includes power sources 1A, 1B, a mixer 202, power routers 203A, 3B, 3C, loads 4A, 4B, and a load voltage command section 5. The same components as those of Embodiment 1 are denoted by the same reference numerals to omit description thereof as appropriate.

In the power network according to the present embodiment, the operations of the mixer 202 and the power router 203A are different from those in Embodiment 1. Specifically, first, the mixer 202 transmits a power packet to the address of the power router 203A. Then, the power router 203A sets the destination of the power packet to either of the addresses of the loads 4A and 4B, based on a command value (target voltage value) inputted from the load voltage command section 5.

The power router 203A includes a plurality of power storage sections. Upon receiving the power packet at either of reception ports In1, In2, the power router 203A allocates the received power packet to the plurality of power storage sections in accordance with the transmission source of the power packet, to store the power packet in the respective power storage sections. Thereafter, the power router 203A transmits the power packet from both the transmission ports Out1 and Out2, based on the command value (target voltage value) inputted from the load voltage command section 5. The configuration of the power router 203A will be described later in detail.

The load voltage command section 5 inputs, to the power router 203A, the command value of the voltage (target voltage value) to be applied to each of the loads 4A, 4B.

Figure 15:
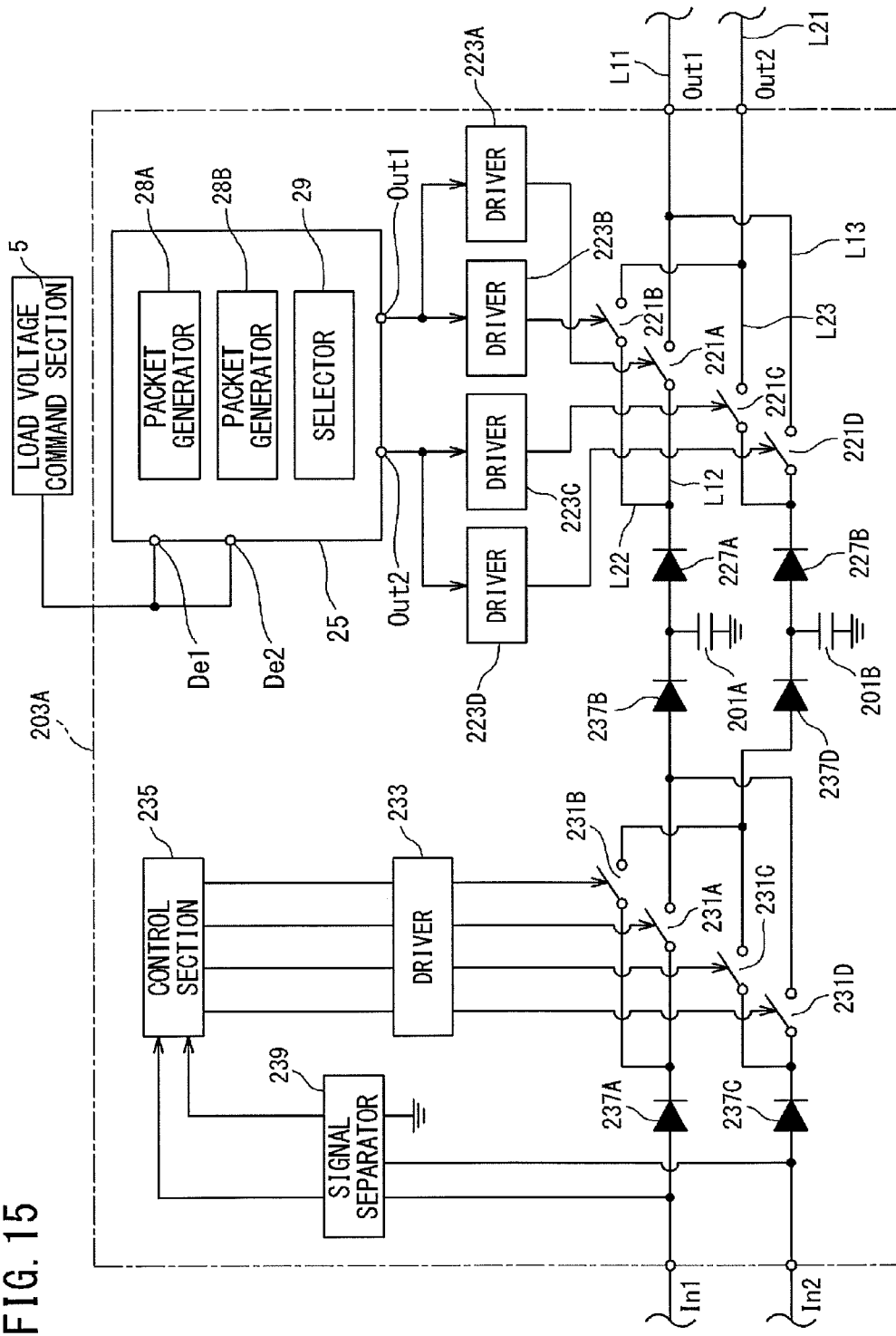
FIG. 15 is a block diagram of a part of the power network according to Embodiment 2.

FIG. 15 is a block diagram illustrating a part of the power network according to the present embodiment.

The power router 203A includes switches 221A to 221D, drivers 223A to 223D, power storage sections 201A, 201B, a control section 25, and diodes 227A, 227B. These components are used to generate a power packet from either of the two power storage sections 201A, 201B, and correspond to a power packet generation section.

The power router 203A further includes switches 231A to 231D, a driver 233, a control section 235, a signal separator 239, and diodes 237A to 237D. These components are used to allocate power packets received at both the two reception ports In1 and In2 to the two power storage sections 201A, 201B in accordance with the transmission sources of the power packets, thereby to store the power packets in the power storage sections 201A, 201B.

The switch 221A has one end connected to the power storage section 201A via the diode D227A, and the other end connected to the transmission port Out1. In other words, the switch 221A is interposed in a sub transmission line L12 that connects the power storage section 201A to a main transmission line L11 passing through the transmission port Out1.

The switch 221B has one end connected to the power storage section 201A via the diode D227A, and the other end connected to the transmission port Out2. In other words, the switch 221B is interposed in a sub transmission line L22 that connects the power storage section 201A to a main transmission line L21 passing through the transmission port Out2.

The switch 221C has one end connected to the power storage section 201B via the diode D227B, and the other end connected to the transmission port Out2. In other words, the switch 221C is interposed in a sub transmission line L23 that connects the power storage section 201B to the main transmission line L21 passing through the transmission port Out2.

The switch 221D has one end connected to the power storage section 201B via the diode D227B, and the other end connected to the transmission port Out1. In other words, the switch 221D is interposed in a sub transmission line L13 that connects the power storage section 201B to the main transmission line L11 passing through the transmission port Out1.

The diode 227A is connected so as to have an anode on the power storage section 201A side, and a cathode on the switch 221A, 221B side.

The diode 227B is connected so as to have an anode on the power storage section 201B side, and a cathode on the switch 221C, 221D side.

These diodes 227A, 227B are provided to prevent current from flowing from the transmission ports Out1, Out2 toward the power storage sections 201A, 201B.

The drivers 223A to 223D cause gate voltages of the switches 221A to 221D to change in accordance with the control signal inputted from the control section 25. The same control signal is inputted to the driver 223A and the driver 223B. The same control signal is inputted to the driver 223C and the driver 223D. Thereby, the switch 221A and the switch 221B are operated in conjunction with each other, and the switch 221C and the switch 221D are operated in conjunction with each other.

The control section 25 includes packet generators 28A, 28B, and a selector 29. The control section 25 is identical to the control section 25 of Embodiment 1.

Since the detail of the operation of the control section 25 is identical to that described in the section <2> of Embodiment 1, repeated description is not necessary.

The switch 231A has one end connected to the reception port In1 via the diode 237A, and the other end connected to the power storage section 201A via the diode 237B.

The switch 231B has one end connected to the reception port In1 via the diode 237A, and the other end connected to the power storage section 201B via the diode 237D.

The switch 231C has one end connected to the reception port In2 via the diode 237C, and the other end connected to the power storage section 201B via the diode 237D.

The switch 231D has one end connected to the reception port In2 via the diode 237C, and the other end connected to the power storage section 201A via the diode 237B.

The diode 237A is connected so as to have an anode on the reception port In1 side, and a cathode on the switch 231A, 231B side.

The diode 237B is connected so as to have an anode on the switch 231A, 231D side, and a cathode on the power storage section 201A side.

The diode 237C is connected so as to have an anode on the reception port In2 side, and a cathode on the switch 231C, 231D side.

The diode 237D is connected so as to have an anode on the switch 231B, 231C side, and a cathode on the power storage section 201B side.

The diodes 237A, 237C are provided to prevent current from flowing from the switches 231A to 231D toward the reception ports In1, In2.

The diodes 237B, 237D are provided to prevent current from flowing from the power storage sections 201A, 201B toward the switches 231A to 231D.

The driver 233 individually changes the gate voltages of the switches 231A to 231D in accordance with the control signal inputted from the control section 235.

The control section 235 specifies the transmission sources of the power packets received at the reception ports In1, In2, based on the signal waveforms inputted from the signal separator 239. Then, the control section 235 controls the driver 233 in accordance with the specified transmission sources of the power packets. The control section 235 inputs, to the driver 233, control signals corresponding to the respective switches 231A to 231D.

For example, it is assumed that a power packet whose transmission source is a commercial power plant is stored in the power storage section 201A, and a power packet whose transmission source is a self-generating power system is stored the power storage section 201B.

Then, it is assumed that both the reception ports In1 and In2 receive the power packet whose transmission source is the commercial power plant. In this case, the control section 235 controls the driver 233 so that the switches 231A, 231D are turned ON and the switches 231B, 231C are turned OFF.

On the other hand, it is assumed that both the reception ports In1 and In2 receive the power packet whose transmission source is the private power plant. In this case, the control section 235 controls the driver 233 so that the switches 231B, 231C are turned ON, and the switches 231A, 231D are turned OFF.

Thus, the control section 235 controls the driver 233 so that the power packets are allocated to and stored in the two power storage sections 201A, 201B in accordance with their transmission sources.

The signal separator 239 is composed of a photo coupler and the like, for example, and individually extracts the signal waveforms of the respective power packets received at the reception ports In1, In2. Then, the signal separator 239 inputs the extracted signal waveforms to the control section 235.

<Verification Test>

The inventors of the present invention have conducted a verification test in order to confirm the effects of the above-described power network.

An exemplary test method includes: constructing the power network according to Embodiment 1 on a computer; reproducing, by computer simulation, the state where power packets are simultaneously supplied to the loads 4A, 4B; and evaluating the electric powers in the loads 4A, 4B at that time.

Test conditions are as follows. As a first condition, the voltage of the first power source 1A is 15 V, the voltage of the second power source 1B is 12 V, electric power corresponding to a target voltage of 8V is supplied from the first power source 1A to the first load 4A, and electric power corresponding to a target voltage of 8V is supplied from the second power source 1B to the second load 4B.

As a second condition, the voltage of the first power source 1A is 14 V, the voltage of the second power source 1B is 12 V, electric power corresponding to a target voltage of 10 V is supplied from the first power source 1A to the first load 4A, and electric power corresponding to a target voltage 8V is supplied from the second power source 1B to the second load 4B.

Further, each power packet is set at $2 \times 10^{-4}$ sec.

An exemplary evaluation method includes: detecting temporal change in the voltage in each of the loads 4A, 4B when the power packets are simultaneously supplied to the loads 4A, 4B; and evaluating the electric powers in the loads 4A, 4B, based on the states of the temporal changes.

FIG. 16 shows graphs each indicating the temporal changes of the voltages in the loads 4A, 4B when the power packets are supplied to the loads 4A, 4B by computer simulation, wherein (a) shows a graph for the first condition, and (b) shows a graph for the second condition.

In FIG. 16, the vertical axis indicates the voltage values (V) in the loads 4A, 4B, and the horizontal axis indicates the elapsed time (sec).

FIG. 16 shows the temporal changes of the voltages, including the transient state from when electric power is started to be applied to the loads 4A, 4B which are in their "0 V" states where no power packets are supplied thereto, to when the electric power reaches the target voltages.

Figure 16A:
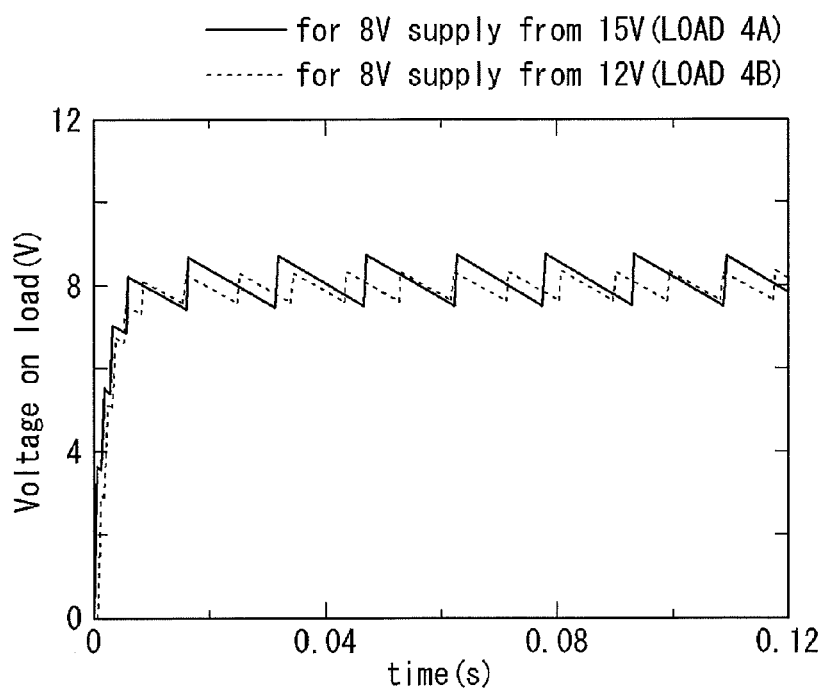
FIG. 16A and FIG. 16B shows graphs each indicating temporal changes of voltages in loads when power packets are supplied to the loads by computer simulation, wherein FIGA shows a graph for a first condition.
Figure 16B:
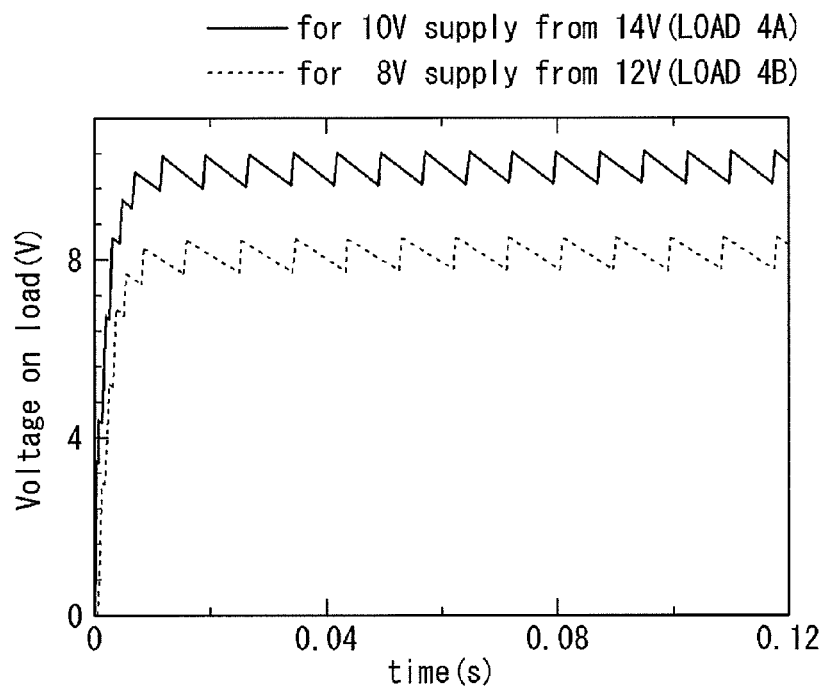

As shown in FIG. 16A, it is confirmed that, as the result of supplying the electric power to the loads 4A, 4B with the target voltage set at 8 V, both the loads 4A, 4B are stably supplied with the electric power near the target voltage. Also in FIG. 16B, it is confirmed from each graph that, as the result of supplying the electric power to the load 4A with the target voltage set at 10 V and to the load 4B with the target voltage set at 8V, both the loads 4A, 4B are stably supplied with the electric power near the respective target voltages.

Based on the above results, it is confirmed that, in the power network including the power packet generation device according to the present embodiment, even when power packets intended for a plurality of loads are generated and supplied to the loads, the power packets can be appropriately transmitted to the respective loads by appropriately adjusting the transmission timings of the power packets destinations of which are different from each other.

<Modification>

(1) While Embodiment 1 has been described for the case where the power network includes two power sources 1A, 1B and two loads 4A, 4B, the number of power sources and the number of loads are not limited thereto. For example, the power network may include three or more power sources and three or more loads. In this case, the mixer may be configured to include three or more packet generators, and a selector that causes the packet generators to generate power packets mutually exclusively.

In particular, when there are three loads, each packet generator may determine, as a transmission destination of a power packet, a load having the greatest absolute value of a difference between a command value and a voltage value applied to the load, among the plurality of loads.

(2) Embodiment 1 has been described for the case where the mixer 2 sets a transmission destination of a power packet, based on a command value inputted from the load voltage command section 5. However, the configuration of the mixer 2 is not necessarily limited to the configuration having the function of setting a transmission destination of a power packet. For example, the mixer 2 may have only the function of selecting either of the power sources 1A, 1B to be used for generation of a power packet, without having the function of setting a transmission destination of the power packet. A specific configuration thereof is as follows.

The mixer 2 includes two packet generators and a selector. Then, the two packet generators set the addresses of loads that have been set as transmission destinations in advance, as transmission destinations of generated power packets.

(3) Embodiment 2 has been described for the case where the power router 203A sets a transmission destination of a power packet, based on a command value inputted from the load voltage command section 5. However, the configuration of the power router 203A is not necessarily limited to the configuration having the function of setting a transmission destination of a power packet. For example, the power router may have only the function of selecting either of the power storage sections 201A, 201B to be used for reconstruction of a power packet, without having the function of setting a transmission destination of the power packet. A specific configuration thereof is as follows.

The power router includes two packet generators and a selector. Then, the two packet generators set the addresses of transmission destinations of power packets received at the reception ports In1, In2, as transmission destinations of reconstituted power packets.

(4) Note that the embodiments and modifications disclosed in the present invention are to be considered in all respects as illustrative and not restrictive. The scope of the present invention is defined by the scope of the claims, and is intended to include meaning equivalent to the scope of the claims and all modifications within the scope.

INDUSTRIAL APPLICABILITY

The power packet generation device, the power router, and the power network according to the present invention are applicable to a power transmission and distribution system, and a domestic power distribution system. Alternatively, they are suitable for power supply to a system including a plurality of sensors and a plurality of drive actuators, power supply to a system including a plurality of lighting apparatuses and a plurality of batteries, and power supply to a system including a plurality of solar cells and a plurality of loads. Further, they are suitable for power management on a substrate in which electric equipment is embedded.

REFERENCE SIGNS LIST 1A, 1B power source (DC power source)
2, 202 mixer (power packet generation device)
3A, 3B, 3C, 203A power router
4A, 4B load (first, second loads)
5 load voltage command section
21A, 21B, 221A, 221B, 221C, 221D, 231A, 231B, 231C, 231D switch
28A, 28B packet generator
29 selector
51A, 51B quantizer (control signal generator)
L1, L11, L21 main transmission line
L2, L3, L12, L13, L22, L23 sub transmission line

The invention claimed is:

1. A power packet generation device configured to generate power packets to be supplied to a plurality of loads, from electric power supplied from at least one DC power source, and transmit the generated power packets to a main transmission line so that target voltages are applied to the respective loads, the power packet generation device comprising:
a plurality of switches respectively interposed in a plurality of sub transmission lines each connecting the DC power source to the main transmission line;
a plurality of packet generators configured to generate the power packets by causing the switches to perform ON/OFF operation, based on the target voltages, and voltages estimated as being applied to the respective loads in each of a first state where the power packets are supplied to the loads and a second state where the power packets are not supplied to the loads; and
a selector configured to perform switching between a state where the packet generators cause the switches to perform ON/OFF operation, and a state where the packet generators maintain the switches in their OFF states.

2. The power packet generation device according to claim 1, wherein
the plurality of packet generators are provided so as to correspond to the plurality of switches, respectively, and
the selector sets any one of the plurality of packet generators in a generation state where the packet generator generates the power packet by causing the switches to perform ON/OFF operation, and sets all the other packet generators in a non-generation state where the packet generators do not generate the power packets by maintaining the switches in their OFF states.

3. The power packet generation device according to claim 2, wherein
when a differential voltage occurs between the target voltage and the voltage estimated as being applied to each of the plurality of loads,
the selector sets each packet generator in either the generation state or the non-generation state, based on the differential voltage between the target voltage and the voltage estimated as being applied to each of the plurality of loads.

4. The power packet generation device according to claim 1, wherein
each packet generator includes a control signal generator configured to generate a control signal that causes the switches to perform ON/OFF operation based on a target voltage obtained in the past.

5. A power network including the power packet generation device according to claim 1.

6. A power router comprising:
at least one power storage section configured to store electric power of a received power packet; and
a power packet generation section configured to generate power packets to be supplied to a plurality of loads, from electric power supplied from the at least one power storage section, and transmit the generated power packets to a main transmission line so that target voltages are applied to the respective loads, wherein
the power packet generation section includes:
a plurality of switches respectively interposed in a plurality of sub transmission lines each connecting the power storage section to the main transmission line;
at least one packet generator configured to generate the power packets by causing the switches to perform ON/OFF operation, based on the target voltages, and voltages estimated as being applied to the respective loads in each of a first state where the power packets are supplied to the loads and a second state where the power packets are not supplied to the loads; and
a selector configured to perform switching between a state where the packet generator causes the switches to perform ON/OFF operation, and a state where the packet generator maintains the switches in their OFF states.

7. The power router according to claim 6, wherein
the plurality of packet generators are provided in one-to-one correspondence to the plurality of switches, and
the selector sets any one of the plurality of packet generators in a generation state where the packet generator generates the power packet by causing the switches to perform ON/OFF operation, and sets all the other packet generators in a non-generation state where the packet generators do not generate the power packets by maintaining the switches in their OFF states.

8. The power router according to claim 7, wherein
when a differential voltage occurs between the target voltage and the voltage estimated as being applied to each of the plurality of loads,
the selector sets each packet generator in either the generation state or the non-generation state, based on the differential voltage between the target voltage and the voltage estimated as being applied to each of the plurality of loads.

9. The power router according to claim 6, wherein
each packet generator includes a control signal generator configured to generate a control signal that causes the switches to perform ON/OFF operation based on a target voltage obtained in the past.

10. A power network including the power router according to claim 6.

* * * * *